(12) United States Patent
Levitsky et al.

(10) Patent No.: US 11,616,667 B2
(45) Date of Patent: Mar. 28, 2023

(54) MULTI-LEVEL CODED MODULATION FOR NON-COHERENT COMMUNICATION

(71) Applicant: QUALCOMM Incorporated, San Diego, CA (US)

(72) Inventors: Michael Levitsky, Rehovot (IL); Assaf Touboul, Netanya (IL); Amit Bar-Or Tillinger, Petach Tikva (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/990,966

(22) Filed: Aug. 11, 2020

(65) Prior Publication Data

US 2022/0052887 A1    Feb. 17, 2022

(51) Int. Cl.
  *H04L 25/49* (2006.01)
  *H04L 27/20* (2006.01)

(52) U.S. Cl.
  CPC ...... *H04L 25/4917* (2013.01); *H04L 27/2035* (2013.01)

(58) Field of Classification Search
  CPC . H04L 25/4917; H04L 25/0272; H04L 27/34; H04L 27/18
  USPC ........................................................ 375/286
  See application file for complete search history.

(56) References Cited

U.S. PATENT DOCUMENTS

| 4,943,983 | A | * | 7/1990 | Critchlow | ......... | H04M 1/72502 |
| | | | | | | 375/244 |
| 5,541,955 | A | * | 7/1996 | Jacobsmeyer | ......... | H03D 3/241 |
| | | | | | | 375/376 |
| 6,882,679 | B2 | * | 4/2005 | Somayazulu | ........... | H04J 13/16 |
| | | | | | | 375/130 |
| 9,385,843 | B2 | | 7/2016 | Khandekar et al. | | |

(Continued)

FOREIGN PATENT DOCUMENTS

| EP | 0827309 B1 | 12/2003 |
| WO | 2016045862 A1 | 3/2016 |
| WO | 2019027360 A1 | 2/2019 |

OTHER PUBLICATIONS

Djordjevic I.B., et al., "Multilevel Coding in M-ary DPSK/ Differential QAM High-Speed Optical Transmission With Direct Detection", vol. 24, No. 1, Jan. 2006, Journal of Lightwave Technology, pp. 420-428.

(Continued)

*Primary Examiner* — Sam K Ahn
*Assistant Examiner* — Gina M McKie
(74) *Attorney, Agent, or Firm* — Muncy, Geissler, Olds and Lowe

(57) ABSTRACT

Disclosed are techniques related to wireless communication system in which multi-level encoded modulation (MLCM) is applied to non-coherent communication. In the proposed techniques, a small fraction of differential phase rotations or bits participating in differential symbol coding are protected with strong codes while other complementary differential phase rotations or bits are protected with weaker codes. Compared to conventional non-coherent communication techniques in which a uniform protection is applied to any fraction of differential phase rotation or any bit of a differential symbol, the proposed MLCM approach enables more spectrally efficient scheme.

30 Claims, 21 Drawing Sheets

(56) References Cited

U.S. PATENT DOCUMENTS

| | | | |
|---|---|---|---|
| 10,135,567 B2 | 11/2018 | Vojcic et al. | |
| 2005/0197065 A1* | 9/2005 | Tamaki | H04L 1/0009 |
| | | | 455/42 |
| 2006/0274855 A1 | 12/2006 | DiBiaso et al. | |
| 2008/0117998 A1* | 5/2008 | Kato | H04L 5/0096 |
| | | | 375/267 |

OTHER PUBLICATIONS

International Search Report and Written Opinion—PCT/US2021/045415—ISA/EPO—dated Nov. 19, 2021.

\* cited by examiner

MULTI-LEVEL CODED MODULATION FOR NON-COHERENT COMMUNICATION

TECHNICAL FIELD

Various aspects described herein generally relate to wireless communication systems, and more particularly, to multi-level coded modulation (MLCM) for non-coherent communication.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One or more aspects may be directed to a source apparatus configured to perform non-coherent transmission. The source apparatus may comprise a transceiver, a memory, and a processor communicatively coupled to the transceiver and the memory. The processor, the memory, and/or the transceiver may be configured to encode, for each modulation level of at least part of a plurality of modulation levels, a corresponding level uncoded data portion with a component code associated with that modulation level to generate a level encoded data portion to be conveyed in a current symbol. An M-ary phase shift keying (PSK) modulation may be partitioned into the plurality of modulation levels. The processor, the memory, and/or the transceiver may also be configured to determine a total differential phase between a previous symbol and the current symbol as a sum of level differential phases of the plurality of modulation levels. The level differential phase of each of the plurality of modulation levels may be based on the level encoded data portion mapped to that modulation level. The processor, the memory, and/or the transceiver may further be configured to transmit the current symbol based on the total differential phase over a wireless channel.

One or more aspects may be directed to a destination apparatus configured to perform non-coherent reception. The destination apparatus may comprise a transceiver, a memory, and a processor communicatively coupled to the transceiver and the memory. The processor, the memory, and/or the transceiver may be configured to receive a symbol from a source apparatus transmitted over a wireless channel. The received symbol may represent a current symbol conveying data and may have been differentially modulated based on M-ary phase shift keying (PSK) modulation with a total differential phase. The total differential phase may be determined as a sum of a plurality of level differential phases. Each of the plurality of level differential phases may correspond to each modulation level of a plurality of modulation levels of the M-ary PSK modulation. A level encoded data portion conveyed in the current symbol may be mapped to each of at least part of the plurality of modulation levels. The processor, the memory, and/or the transceiver may also be configured to determine the plurality of level differential phases corresponding to the plurality of modulation levels based on the received symbol. The processor, the memory, and/or the transceiver may further be configured to extract, for each modulation level, data portion from the level differential phase corresponding to that modulation level. The extracted data portion of each of the at least part of the plurality of modulation levels may be a level encoded data portion that has been protected with a component code associated with that modulation level. The processor, the memory, and/or the transceiver may yet be configured to decode, for each of the at least part of the plurality of modulation levels, the level encoded data portion of that modulation level to obtain a corresponding level decoded data portion.

One or more aspects may be directed to a method of a source apparatus configured to perform non-coherent transmission. The method may comprise encoding, for each modulation level of at least part of a plurality of modulation levels, a corresponding level uncoded data portion with a component code associated with that modulation level to generate a level encoded data portion to be conveyed in a current symbol. An M-ary phase shift keying (PSK) modulation may be partitioned into the plurality of modulation levels. The method may also comprise determining a total differential phase between a previous symbol and the current symbol as a sum of level differential phases of the plurality of modulation levels. The level differential phase of each of the plurality of modulation levels may be based on the level encoded data portion mapped to that modulation level. The method may further comprise transmitting the current symbol based on the total differential phase over a wireless channel.

One or more aspects may be directed to a method of a destination apparatus configured to perform non-coherent reception. The method may comprise receiving a symbol from a source apparatus transmitted over a wireless channel. The received symbol may represent a current symbol conveying data and may have been differentially modulated based on M-ary phase shift keying (PSK) modulation with a total differential phase. The total differential phase may be determined as a sum of a plurality of level differential phases. Each of the plurality of level differential phases may correspond to each modulation level of a plurality of modulation levels of the M-ary PSK modulation. A level encoded data portion conveyed in the current symbol may be mapped to each of at least part of the plurality of modulation levels. The method may also comprise determining the plurality of level differential phases corresponding to the plurality of modulation levels based on the received symbol. The method may further comprise extracting, for each modulation level, data portion from the level differential phase corresponding to that modulation level. The extracted data portion of each of the at least part of the plurality of modulation levels may be a level encoded data portion that has been protected with a component code associated with that modulation level. The method may yet comprise decoding, for each of the at least part of the plurality of modulation levels, the level encoded data portion of that modulation level to obtain a corresponding level decoded data portion.

One or more aspects may be directed to a source apparatus configured to perform non-coherent transmission. The source apparatus may comprise means for encoding, for each modulation level of at least part of a plurality of modulation levels, a corresponding level uncoded data portion with a component code associated with that modulation level to generate a level encoded data portion to be conveyed in a current symbol. An M-ary phase shift keying (PSK) modulation may be partitioned into the plurality of modulation levels. The source apparatus may also comprise means for determining a total differential phase between a previous symbol and the current symbol as a sum of level differential phases of the plurality of modulation levels. The level differential phase of each of the plurality of modulation levels may be based on the level encoded data portion mapped to that modulation level. The source apparatus may further comprise means for transmitting the current symbol based on the total differential phase over a wireless channel.

One or more aspects may be directed to a destination apparatus configured to perform non-coherent reception. The destination apparatus may comprise means for receiving a symbol from a source apparatus transmitted over a wireless channel. The received symbol may represent a current symbol conveying data and may have been differentially modulated based on M-ary phase shift keying (PSK) modulation with a total differential phase. The total differential phase may be determined as a sum of a plurality of level differential phases. Each of the plurality of level differential phases may correspond to each modulation level of a plurality of modulation levels of the M-ary PSK modulation. A level encoded data portion conveyed in the current symbol may be mapped to each of at least part of the plurality of modulation levels. The destination apparatus may also comprise means for determining the plurality of level differential phases corresponding to the plurality of modulation levels based on the received symbol. The destination apparatus may further comprise means for extracting, for each modulation level, data portion from the level differential phase corresponding to that modulation level. The extracted data portion of each of the at least part of the plurality of modulation levels may be a level encoded data portion that has been protected with a component code associated with that modulation level. The destination apparatus may yet comprise means for decoding, for each of the at least part of the plurality of modulation levels, the level encoded data portion of that modulation level to obtain a corresponding level decoded data portion.

One or more aspects may be directed a non-transitory computer-readable medium storing computer-executable instructions for a source apparatus configured to perform non-coherent transmission. The computer-executable instructions may comprise one or more instructions causing the source apparatus to encode, for each modulation level of at least part of a plurality of modulation levels, a corresponding level uncoded data portion with a component code associated with that modulation level to generate a level encoded data portion to be conveyed in a current symbol. An M-ary phase shift keying (PSK) modulation may be partitioned into the plurality of modulation levels. The computer-executable instructions may also comprise one or more instructions causing the source apparatus to determine a total differential phase between a previous symbol and the current symbol as a sum of level differential phases of the plurality of modulation levels. The level differential phase of each of the plurality of modulation levels may be based on the level encoded data portion mapped to that modulation level. The computer-executable instructions may further comprise one or more instructions causing the source apparatus to transmit the current symbol based on the total differential phase over a wireless channel.

One or more aspects may be directed to a non-transitory computer-readable medium storing computer-executable instructions for a destination apparatus configured to perform non-coherent reception. The computer-executable instructions may comprise one or more instructions causing the destination apparatus to receive a symbol from a source apparatus transmitted over a wireless channel. The received symbol may represent a current symbol conveying data and may have been differentially modulated based on M-ary phase shift keying (PSK) modulation with a total differential phase. The total differential phase may be determined as a sum of a plurality of level differential phases. Each of the plurality of level differential phases may correspond to each modulation level of a plurality of modulation levels of the M-ary PSK modulation. A level encoded data portion conveyed in the current symbol may be mapped to each of at least part of the plurality of modulation levels. The computer-executable instructions may also comprise one or more instructions causing the destination apparatus to determine the plurality of level differential phases corresponding to the plurality of modulation levels based on the received symbol. The computer-executable instructions may further comprise one or more instructions causing the destination apparatus to extract, for each modulation level, data portion from the level differential phase corresponding to that modulation level. The extracted data portion of each of the at least part of the plurality of modulation levels may be a level encoded data portion that has been protected with a component code associated with that modulation level. The computer-executable instructions may yet comprise one or more instructions causing the destination apparatus to decode, for each of the at least part of the plurality of modulation levels, the level encoded data portion of that modulation level to obtain a corresponding level decoded data portion.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
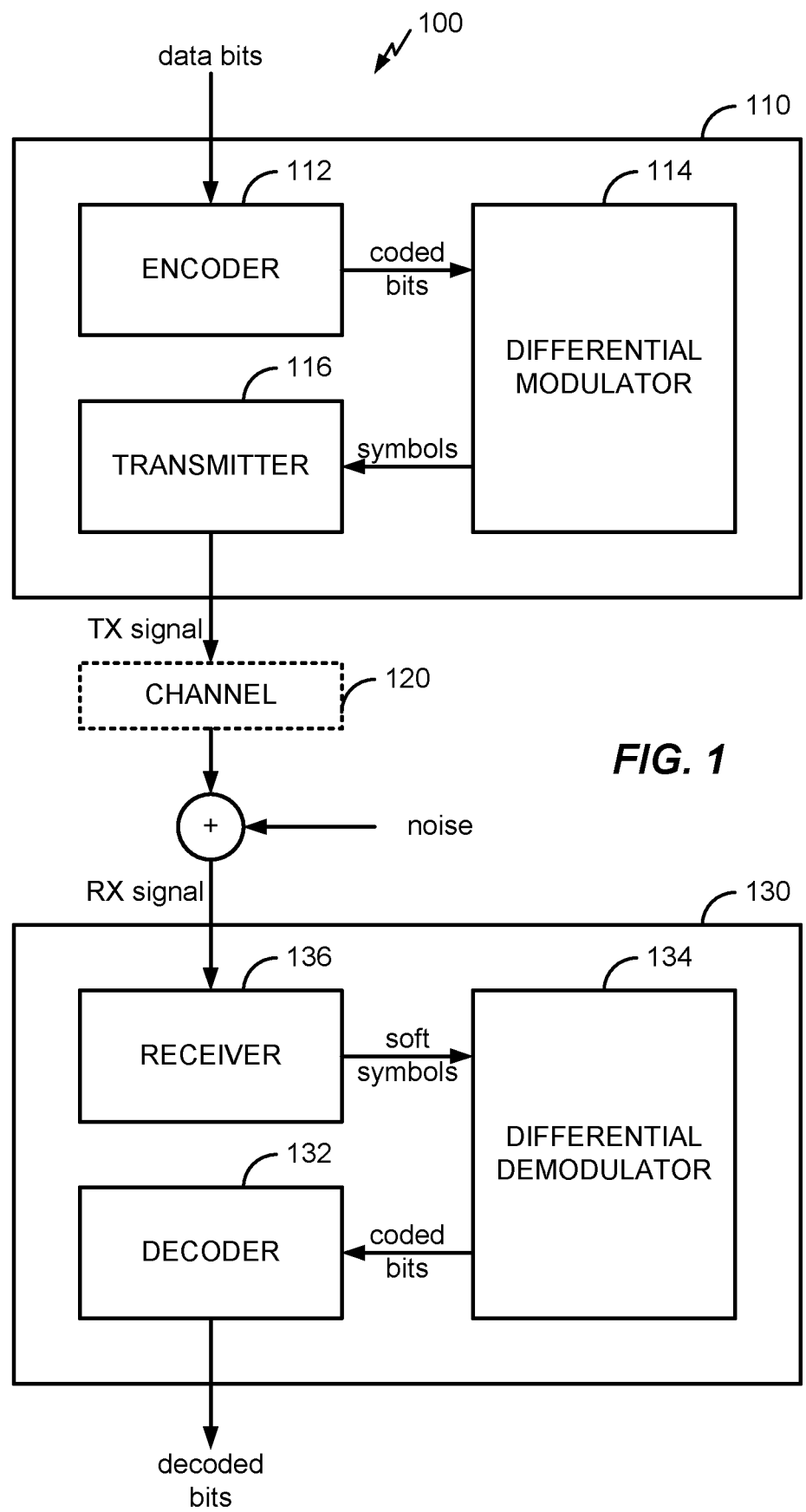
FIG. 1 illustrates a wireless communication system scenario that implements conventional differential modulation scheme.

Various aspects described herein generally relate to wireless communication systems, and more particularly, to multi-level coded modulation (MLCM) for non-coherent communication. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference signals the UE is measuring.

As indicated above, various aspects described herein relate to wireless communication systems, and more particularly, to multi-level coded modulation (MLCM) for non-coherent communication. Non-coherent modulation based on differential decoding can be an attractive approach for scenarios where it is very challenging or even impossible to efficiently track or get a good estimate of the channel. Some of these scenarios are listed below:

Communication in high mobility/Doppler environment that introduces very fast channel variations. Tracking fast changing channel requires very dense in time/frequency pilot. Unfortunately, such pilot degrades efficiency of the channel use and for very high speeds still does not allow to get a good channel estimation quality. This means that spectral efficiency and link performance of coherent modulation schemes is very limited.

Usage of small allocations that typically conveys too small number of pilots to allow good quality of channel estimation. This results in limited performance of coherent demodulation schemes.

PHY schemes that are very sensitive to channel variations and require very tight channel tracking (COMP, Massive MIMO).

Another advantage of non-coherent modulation is that its demodulation is relatively simple, and thus, allows to the processing requirements of the receiver to be significantly reduced. This can pave the way to dramatic improvement in power consumption, memory and corresponding device cost. Simple demodulation that does not require buffering can also allow the latency to be reduced.

Despite such advantages of non-coherent modulation schemes, they did not get a good traction in communication schemes since they are less spectrally efficient than coherent modulation schemes for typical channel conditions. This drawback is a result of:

Non-efficient I,Q mapping used in differential schemes that does not fully exploit 2D space.

Multiplication operation involved in the differential demodulation scheme that introduces at least 3 db degradation in SNR (known as squaring noise phenomena).

Differential demodulation schemes also suffer from error propagation.

FIG. 1 illustrates a scenario 100 in which conventional differential modulation scheme is used to communicate between a source apparatus 110 and a destination apparatus 130. The source apparatus 110 transmits one or more TX signals over a channel 120 to the destination apparatus 130. The destination apparatus 130 receives one or more RX signals from the source apparatus 110 over the channel 120. It may be assumed that the RX signals correspond to the TX signals with noise of the channel 120.

The conventional source apparatus 110 includes an encoder 112, a differential modulator 114, and a transmitter 116. The encoder 112 encodes data bits to output coded bits. The differential modulator 114 converts the coded bits from the encoder 112 into symbols. The transmitter 116 transmits the TX signal in a waveform in accordance with the symbols from the differential modulator 114, over the channel 120 to the destination apparatus 130.

The conventional destination apparatus 130 includes a receiver 136, a differential demodulator 134, and a decoder 132. The receiver 136 receives the RX signal waveform and outputs soft symbols. The differential demodulator 134 deconverts the soft symbols from the receiver into coded bits. Thereafter, the decoder 132 decodes the coded bits to decoded bits, which should match the data bits when the source and destination apparatuses 110, 130 operate correctly.

Figure 2A:
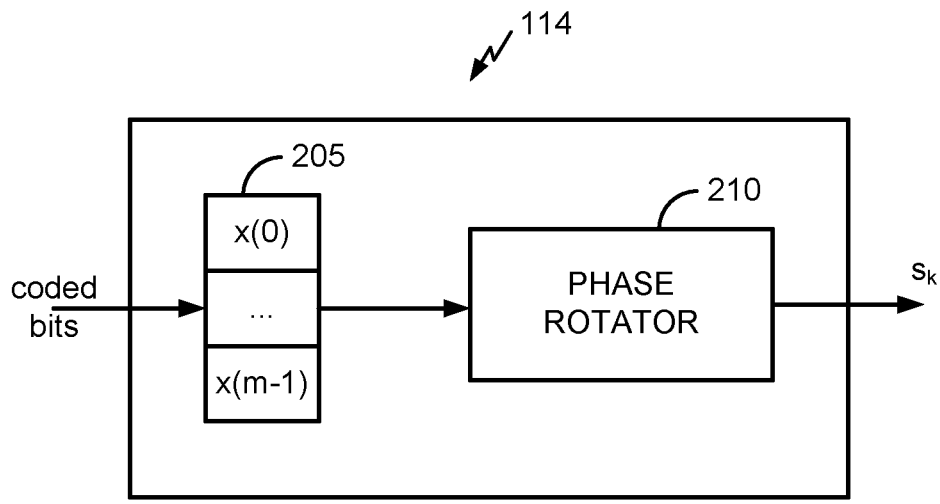
FIGS. 2A and 2B illustrate a conventional differential modulator.
Figure 2B:
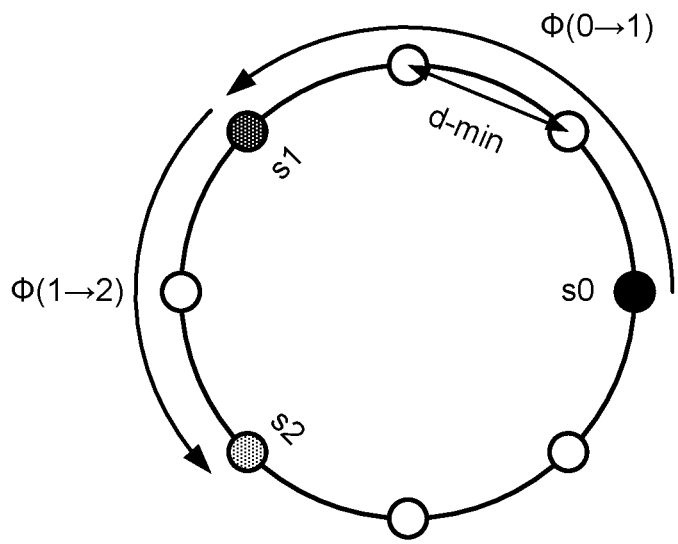

FIGS. 2A and 2B illustrate an operation of the differential modulator 114 (of the conventional source apparatus 110) in more detail. In this instance, an M-ary differential phase shift keying (PSK) modulation is assumed. In M-ary PSK, it may be assumed that M symbols are uniformly distributed on constellation circle with constant radius. For example, as seen in FIG. 2B, a constellation in which M=8 is shown where each symbol is separated by a phase of 45° or π/4.

As seen in FIG. 2A, the differential modulator 114 receives the coded bits from the encoder 112, in which symbol bits for a symbol, which are a group of m bits $(x(0), \ldots x(m-1))$ of the coded bits, define a phase rotation $\Phi$ between two consecutive symbols. The values m and M are related as follows: $m = \log_2 M$. The phase rotator 210 outputs a symbol $s_k$ whose phase is rotated by $\Phi$ from the phase of a previous symbol $s_{k-1}$. In an M-ary differential PSK, there can be M phases $\Phi$ (i.e., M options: 0, $$\left(\text{i.e., } M \text{ options: } 0, 2\pi\frac{1}{M}, 2\pi\frac{2}{M}, \ldots 2\pi\frac{M-1}{M}\right).$$

FIG. 2B illustrates examples of phase rotations. Each phase rotation is denoted as Φ(a→b) to indicate phase difference between a previous symbol that was transmitted and a current symbol that is to be transmitted. Hence, Φ(a→b) may also be referred to as differential phase. In FIG. 2B, two phase rotations Φ(0→1) and Φ(1→2) are shown, in which coded bits {x(0) . . . x(m−1)} define T(0→1) and coded bits {x(m) x(2m−1)} define Φ(1→2). In this instance, M=8 meaning that m=3. Assume that the phase of an initial symbol $s_0$ is 0. Also assume that the coded bits {x(0), x(1), x(2)} for symbol $s_1$ indicate that phase of $s_1$ should be rotated by an amount 3π/4 from the phase of symbol $s_0$, that is, Φ(0→1)=3π/4. The phase of symbol $s_1$ is then the phase of previous symbol $s_0$ plus the differential phase Φ(0→1), i.e., 0+3π/4=3π/4.

For the next symbol $s_2$, assume that the coded bits {x(3), x(4), x(5)} indicate that the phase of $s_2$ should be rotated by an amount π/2 from the phase of $s_1$, i.e., Φ(1→2)=π/2. The phase of symbol $s_2$ is then the phase of previous symbol $s_1$ plus the differential phase Φ(1→2), i.e., 3π/4+π/2=5π/4.

Figure 2C:
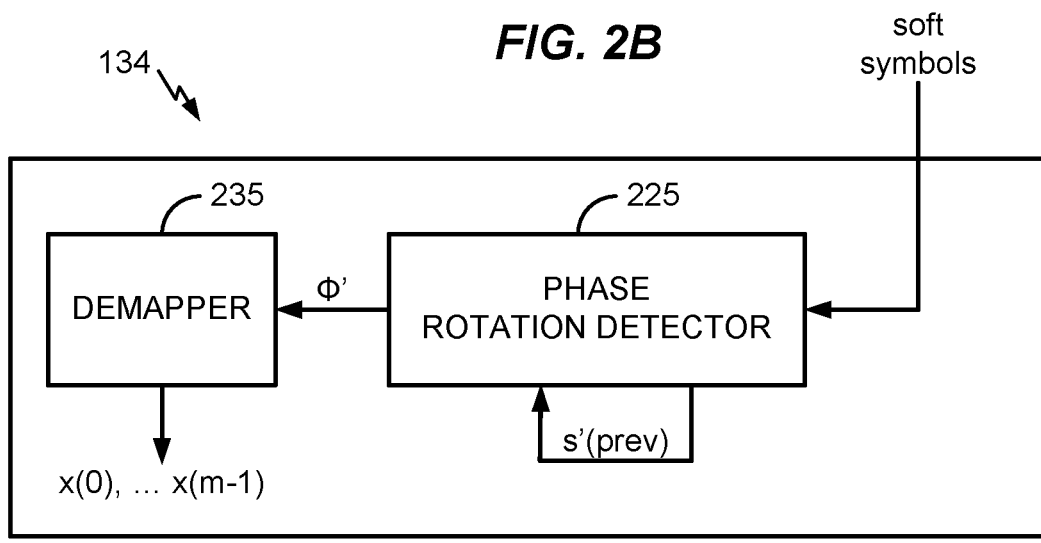
FIG. 2C illustrates a conventional differential demodulator.

For completeness, a detailed view of the differential demodulator 134 is illustrated in FIG. 2C. The differential demodulator 134 includes a phase rotation detector 225 and a demapper 235. The phase rotation detector 225 receives the soft symbols from the receiver 136 to classify the received soft symbols to the closest symbol of the M-ary constellation, and determines a current symbol s' as well as a previous symbol s'(prev) through such classifications. The phase rotation detector 225 determines the differential phase Φ' of the current symbol s' relative to the previous symbol s'(prev). The demapper 235 demaps the differential phase Φ' from the phase rotation detector 225 into coded bits x(0), . . . x(m−1), which are then provided to the decoder 132.

Figure 3:
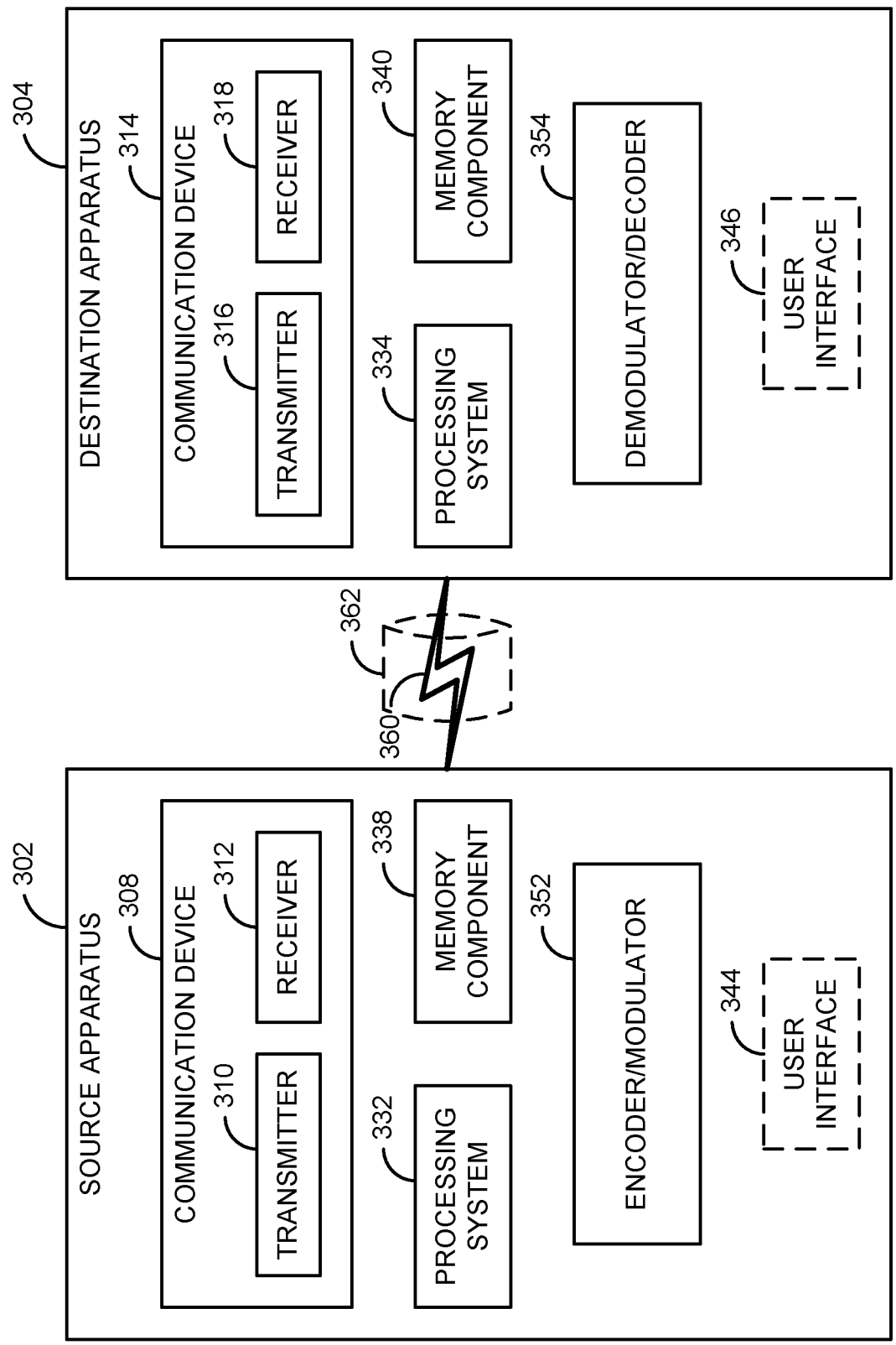
FIG. 3 is a simplified block diagram of several sample aspects of components that may be employed in wireless communication nodes and configured to support communication, according to various aspects.

FIG. 3 illustrates several sample components (represented by corresponding blocks) that may be incorporated into a source apparatus 302 (e.g., UE, base station, mobile terminal, etc.) and a destination apparatus 304 (e.g., UE, base station, mobile terminal, etc.) to support the operations (e.g., non-coherent communications) as disclosed herein. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The source apparatus 302 and the destination apparatus 304 each may include at least one wireless communication device (represented by the communication devices 308 and 314) for communicating with other apparatuses via at least one designated RAT (e.g., LTE, 5G NR). Each communication device 308 may include at least one transmitter (represented by the transmitter 310) for transmitting signals (e.g., messages, indications, information, and so on) and at least one receiver (represented by the receiver 312) for receiving signals (e.g., messages, indications, information, pilots, and so on). Each communication device 314 may include at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array. Similarly, a receiver may include a plurality of antennas. In an aspect, the transmitter and receiver may share the same plurality of antennas.

The apparatuses 302, 304 may also include other components that may be used in conjunction with the operations as disclosed herein. The source apparatus 302 may include a processing system 332 for providing functionality relating to, for example, performing non-coherent communications as disclosed herein and for providing other processing functionality. The destination apparatus 304 may include a processing system 334 for providing functionality relating to, for example, performing non-coherent communications as disclosed herein and for providing other processing functionality. In an aspect, the processing systems 332, 334 may include, for example, one or more general purpose processors, multi-core processors, ASICs, digital signal processors (DSPs), field programmable gate arrays (FPGA), or other programmable logic devices or processing circuitry.

The apparatuses 302, 304 may include memory components 338, 340 (e.g., one or more memory devices), respectively, for maintaining information (e.g., information indicative of reserved resources, thresholds, parameters, and so on). In addition, the apparatuses 302, 304 may include user interface devices 344, 346, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 352 may be implemented by processor and memory component(s) of the apparatus 302 (e.g., by execution of appropriate code and/or by appropriate configuration of processor components). Similarly, some or all of the functionality represented by blocks 314, 334, 340, 346, and 354 may be implemented by processor and memory component(s) of the apparatus 304 (e.g., by execution of appropriate code and/or by appropriate configuration of processor components).

The source apparatus 302 may transmit and receive messages via a wireless link 360 with the destination apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the source apparatus 302 and the destination apparatus 304 for the medium 362.

As a particular example, the medium 362 may correspond to at least a portion of licensed/unlicensed frequency band shared with another RAN and/or other APs and UEs. In general, the source apparatus 302 and the destination apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on.

The source apparatus 302 may include an encoder/modulator component 352 configured to code and modulate data according to techniques described herein. The destination apparatus 304 may include a demodulator/decoder component 354 configured to demodulate and decode received signals according to techniques described herein.

As indicated above, there are disadvantages to non-coherent modulation schemes. For example, they are less spectrally efficient than coherent modulation schemes for typical channel conditions. To address such issues, a novel non-coherent modulation approach is proposed. In particular, it is proposed to combine a modulation set partitioning concept with multi-level coded modulation (MLCM) approach to improve spectral efficiency and/or reliability of non-coherent modulation schemes.

Reliability of the differential modulation schemes is limited by d-min (see FIG. 2B), which is the Euclidian distance between adjacent constellation symbols in a differential constellation order M. Note that d-min is related to phase difference between the adjacent neighboring symbols. To reliably resolve the phase rotation between two consecutive symbols, d-min should be higher than phase deviations caused by noise and other channel impairments. As seen, as the constellation M increases (e.g., from 8 to 16 to 32 and so on), the d-min separation shrinks, which presents increasing challenges.

A straight forward approach is to assume uniform protection (e.g., error correction) for any fraction of differential phase rotation or for any bit participating in differential symbol coding. But as will be explained in further detail below, only a small fraction of phase rotations is more vulnerable to decision errors. Thus, in an aspect, it is proposed to partition M-ary modulation into one or more levels, and set different component codes to different levels based on the vulnerabilities to errors corresponding to the levels. In particular, it is proposed to apply multi-level coded modulation (MLCM) concepts in modulating data bits into symbols at the transmit side (e.g., at the source apparatus), and in demodulating symbols back into data bits at the receive side (e.g., at the destination apparatus).

For explanation purposes, application of MLCM to M-ary PSK modulation will be described. At the transmit side, e.g., at the source apparatus (e.g., network node, user equipment (UE), etc.), the MLCM application may generally include the following: (A) partition M-ary PSK modulation into one or more modulation levels; (B) decompose the differential phase between two consecutive transmitted symbols as a cumulative complementary differential phases of all modulation levels; and (C) encode each modulation level with component code particular to that modulation level.

Regarding (A), partitioning of M-ary PSK modulations may be described with the following parameters:
N—number of modulation levels;
(N−1)—number of partitioning levels;
Pn—number of constellation subsets within each partitioning level, n=1 . . . N−1 such that $\log_2$ Pn defines how many encoded bits per symbol will be used to convey relative subset selection/rotation of that partitioning level;
Q—modulation order of the modulation level N—referred to as the smallest set level (since this is the level in which constellation has the smallest number of symbols of all modulation levels)—such that $\log_2$ Q defines how many encoded bits per symbol will be used to convey relative symbol phase within the constellation of the smallest set level.

The number of bits used to define differential symbol on an M-ary constellation grid may be expressed as follows:

$$\log_2 M = \sum_{n=1}^{N-1} \log_2 Pn + \log_2 Q \qquad (1)$$

Before proceeding further, the relationship between modulation levels, partitioning levels, and smallest set level is clarified. In general, all modulation levels can each have a PSK constellation (e.g., 4PSK, 8PSK, 16PSK, etc.) and each modulation level can have a corresponding level differential phase that contributes to determining a total differential phase. But in one or more aspects, a partitioning level may be viewed as a modulation level whose PSK constellation set (also referred to as level n PSK constellation) is divided into multiple PSK constellation subsets (also referred to as level n constellation subsets). The level differential phase contributed by each partitioning level may then reflect relative phases/rotations of the level constellation subsets of the partitioning level.

On the other hand, the smallest set level, which is the modulation level N, may be viewed as the one modulation level whose level N constellation set (also referred to as smallest PSK constellation set) is NOT further subdivided into PSK constellation subsets. Instead, the level N differential phase contributed by the smallest set level may then reflect the positions of the symbols of the smallest PSK constellation set. Thus, in total, there can be total of N modulation levels (N−1 partitioning levels and smallest set level).

For the remainder of the description, modulation levels n, n=1 . . . N−1 may be synonymously be used with partitioning levels n, n=1 . . . N−1, and modulation level N may be synonymously be used with smallest set level. In one or more aspect the plurality of modulation levels may include at least a partitioning level 1 and a smallest set level. The relationships among the modulation levels may be as follows. Each modulation level n, n=1 . . . N−1 (i.e., each partitioning level n) may be a parent level of modulation level n+1. Conversely, each modulation level n, n=2 . . . N may be a child level of modulation level n−1. This means that the smallest set level (i.e., modulation level N) is a child level of partitioning level N−1. The parent/child level relationships will be explained in further detail below.

Figure 4A:
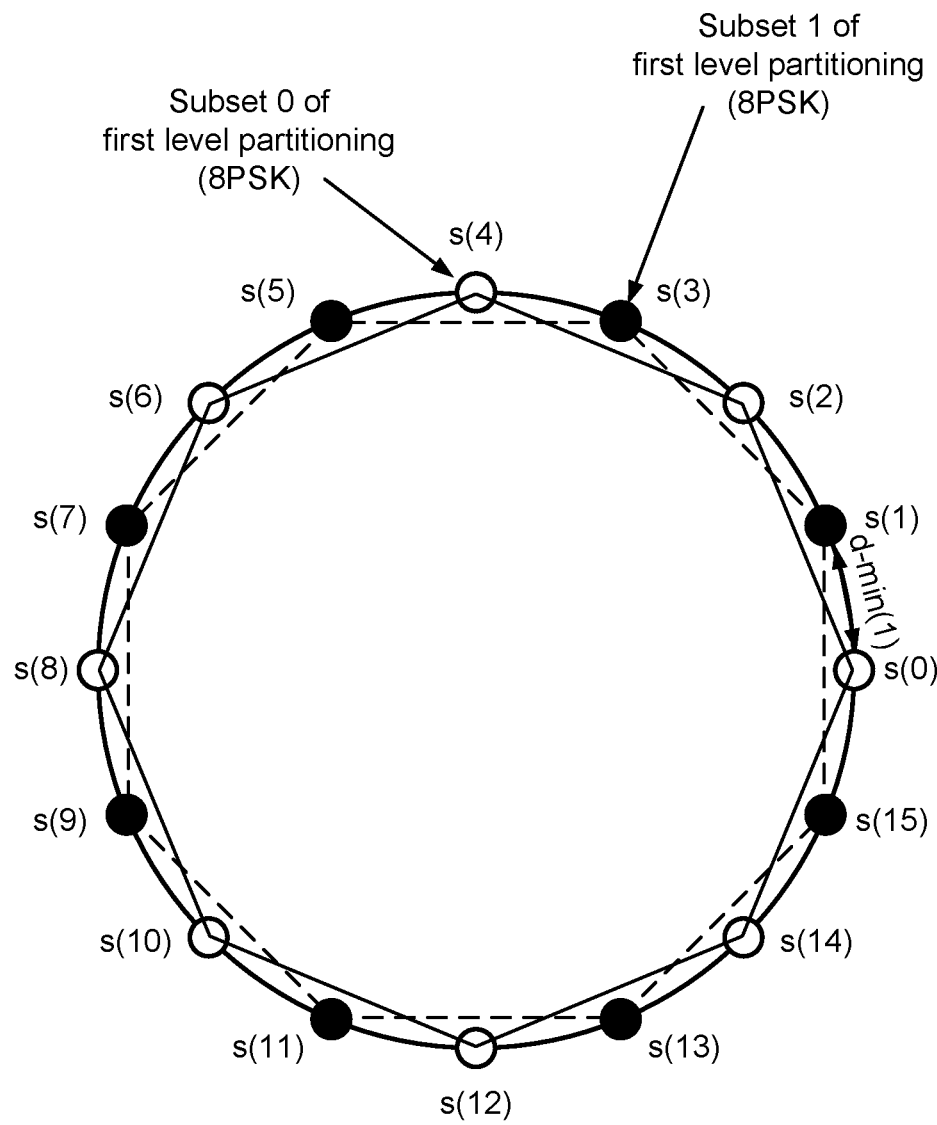
FIGS. 4A-4C illustrates an example partitioning of an M-ary constellation into a plurality of modulation levels (modulation/constellation subsets), according to various aspects.
Figure 4B:
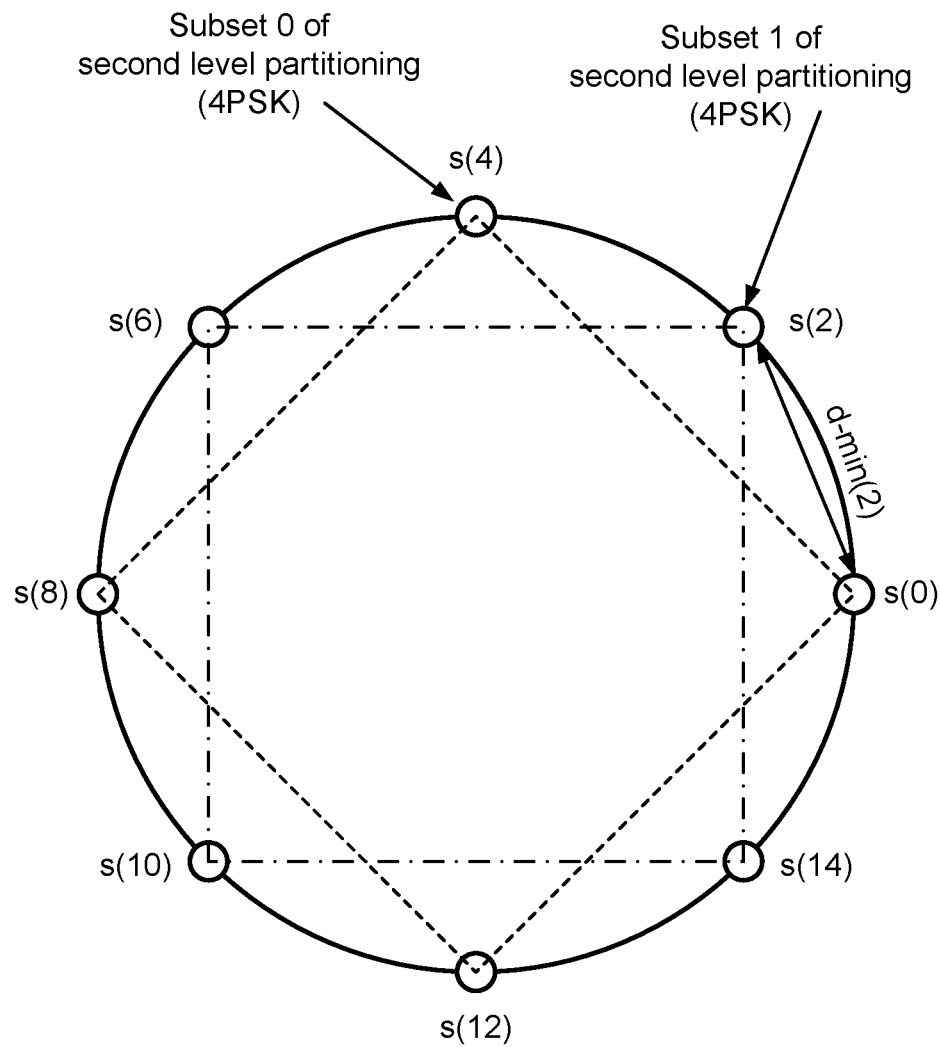
Figure 4C:
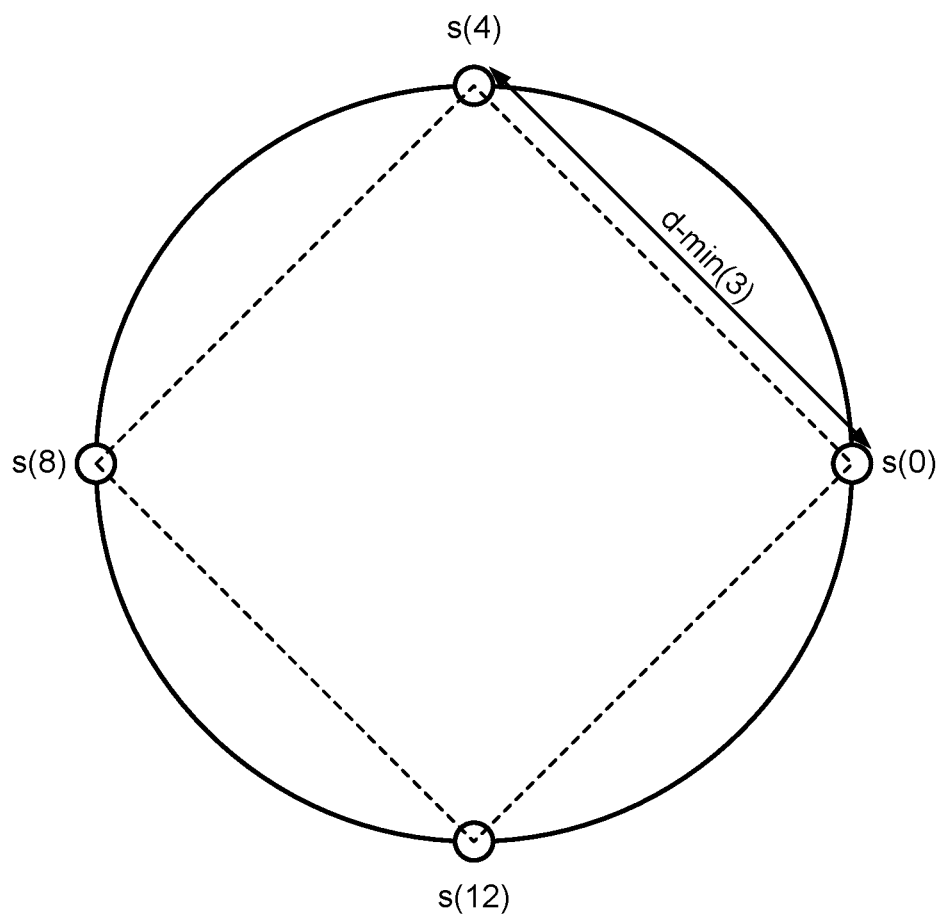

FIGS. 4A, 4B, and 4C illustrate a specific example of application of MLCM on the transmit side. FIG. 4A illustrates a 16PSK constellation (e.g., M=16). Thus, sixteen symbols s(0)-s(15) may be uniformly distributed on a constellation circle of a particular radius. Thus, every neighboring symbol may be spaced by π/8 phase distance. In this particular example, the following parameter values are assumed:

Three modulation levels (N=3) including the smallest set level=>Two partitioning levels N−1=2

Two constellation subsets within partitioning level 1 (P1=2);

Two constellation subsets within partitioning level 2 (P2=2); and

Four symbols in the smallest set level (Q=4).

FIG. 4A illustrates the first modulation level that is partitioned. As such, this is partitioning level 1. As seen, at partitioning level 1, the original 16PSK constellation is divided into two subsets of 8PSK constellations (i.e., P1=2). Thus, for partitioning level 1, the level 1 PSK constellation set is the original 16PSK constellation, and the two level 1 PSK constellation subsets are the two 8PSK constellations. The first level 1 PSK constellation subset (e.g., subset 0) includes all even symbols (s(0), s(2) . . . s(14)) of the original 16PSK constellation, and the second level 1 PSK constellation subset (e.g., subset 1) includes all odd symbols (s(1), s(3) . . . s(15)) of the original 16PSK constellation.

Recall that d-min value of an M-ary PSK constellation is related to phase difference between adjacent constellation symbols. Within the original 16PSK constellation, the d-min value, referred to as "d-min(1)", may represent the Euclidian distance of adjacent symbols. In this context, the d-min may indicate the relative phase difference between the two level 1 PSK constellation subsets—subset 0 and subset 1—of the partitioning level 1.

In general, when partitioning level n is partitioned, one of the level n constellation subsets of the partitioning level n is selected and passed to its child level, which may be a next partitioning level n+1 or the smallest set level (if n+1−N). If the child level is another partitioning level n+1, then the level n constellation subset selected at partitioning level n becomes the level n+1 constellation of the child partitioning level n+1. If the child level is the smallest set level, then the selected level n constellation subset becomes the smallest PSK constellation set, which may also be designated as the level N constellation. In general, the level n+1 constellation of a child level may be constrained to the selected level n constellation subset of parent partitioning level n.

In FIG. 4A, when partitioning level 1 is partitioned, one of the two level 1 PSK constellation subsets is selected and becomes the constellation of next modulation level as seen in FIG. 4B. In this instance, it is assumed that subset 0 (subset with all even symbols) is selected at partitioning level 1, which becomes the level 2 PSK constellation set. It is also assumed that the level 2 PSK constellation set of FIG. 4B is also partitioned. That is, FIG. 4B illustrates an example of partitioning level 2. The level 2 PSK constellation set of partitioning level 2 is constrained to the level 1 PSK constellation subset 0 selected at partitioning level 1.

It is further assumed that the level 2 PSK constellation set (the 8PSK constellation) is further divided into two 4PSK constellations subsets. In other words, P2=2. Here, the first level 2 PSK constellation subset—subset 0—includes symbols (s(0), s(4), s(8), s(12)) of the 8PSK level 2 PSK constellation set. The second level 2 PSK constellation subset—subset 1—includes symbols (s(2), s(6), s(10), s(14)) of the 8PSK level 2 PSK constellation set. The d-min value of the 8PSK constellation is d-min(2), which represents the Euclidian distance of adjacent symbols of the 8PSK level 2 PSK constellation set, and is related to the relative rotations of the two level 2 PSK constellation subsets.

While not shown in FIG. 4B, the level 1 PSK constellation subset 1 (comprising all odd symbols) of partitioning level 1 can also be subdivided into two 4PSK constellation subsets, one with symbols (s(1), s(5), s(9), s(13)) and another with symbols (s(3), s(7), s(11), s(15)).

In FIG. 4B, when partitioning level 2 is partitioned, one of the two level 2 PSK constellation subsets is selected and becomes the PSK constellation set of next modulation level as seen in FIG. 4C. For example, it may be assumed that subset 0 (4PSK constellation with s(0), s(4), s(8), s(12)) is selected at partitioning level 2. In this instance, 4PSK constellation is assumed to be the smallest set level, i.e., the constellation is not divided into further subsets. As such, FIG. 4C illustrates an example of a smallest set level or modulation level N and Q=4. Again, the smallest PSK constellation set is constrained to the level 2 PSK constellation subset selected at partitioning level 2, which is the parent level of the smallest set level.

The d-min(3) represents the d-min value at the smallest set level, which is represents the Euclidian distance of adjacent symbols of the 4PSK smallest PSK constellation set. As will be explained further below, determination of the smallest set level may be associated with the d-min of constellations at different levels.

While not shown in FIG. 4C, other 4PSK constellations at the smallest set level include 4PSK constellations of (s(1), s(5), s(9), s(13)), (s(2), s(6), s(10), s(14)), and (s(3), s(7), s(11), s(15)).

Regarding (B) of MCLM application, decomposing the total differential phase into cumulative complementary differential phases may be expressed as follows:

$$\emptyset_k = \sum_{n=1}^{N-1} \emptyset_k(n) + \emptyset_k(N) \qquad (2)$$

In equation (2), $\emptyset_k(n)$, n=1 . . . N−1 may convey a level n differential phase between level n partitioning subsets of the current symbol $s_k$ and of the previous symbol $s_{k-1}$. Also, $\emptyset_k(N)$ may convey a level N differential phase between the current and previous symbols $s_k$, $s_{k-1}$ within the smallest set level. As expressed in equation (2), a total differential phase $\emptyset_k$ associated with the current symbol $s_k$ can be viewed as an accumulation of sub-rotations at each modulation level, i.e., as an accumulation of level n differential phases $\emptyset_k(n)$ corresponding to each modulation level n, n=1 . . . N.

Regarding (C), encoding at each modulation level is described as follows. Typically, raw information, i.e., uncoded bits, may be encoded with component code (e.g., error correction code), and the resulting coded bits may be modulated onto transmitted symbol.

But as indicated above, it is proposed to encode each modulation level with component code particular to that modulation level. Before proceeding further, the following concepts are introduced for descriptive purposes. At the source side, an uncoded block of information (or simply "uncoded block") may comprise some number of uncoded bits (e.g., at least a plurality of uncoded bits). The uncoded block may be encoded into a corresponding encoded block comprising some number of encoded bits (e.g., at least a plurality of encoded bits). Typically the encoded block is larger (has greater number of bits). The encoded block may be modulated onto symbols and transmitted to the destination.

The uncoded bits of the uncoded block may be divided into N level uncoded data portions in which each level n, n=1 . . . N uncoded data portion corresponds to each modulation level n. Each level n uncoded data portion may comprise a portion of the uncoded bits of the uncoded block. That is, each level n uncoded data portion may comprise one or more uncoded bits of the uncoded block. For ease of reference, the one or more uncoded bits of each level n uncoded data portion may be referred to as level n uncoded bits. The uncoded block may be represented as a sum of all level n uncoded data portions. This implies that each uncoded bit of the uncoded block is in at least one level n uncoded data portion.

Similarly, the encoded bits of the encoded block may also be divided into N level encoded data portions in which each level n, n=1 . . . N encoded data portion corresponds to each modulation level n. Each level n encoded data portion may comprise a portion of the encoded bits of the encoded block, i.e., each level n encoded data portion may comprise one or more encoded bits of the encoded block. For ease of reference, the one or more encoded bits of each level n encoded data portion may be referred to as level n encoded bits. The encoded block may be represented as a sum of all level n encoded data portions, which implies that each encoded bit of the encoded block is in at least one level n encoded data portion.

In the proposed technique, for each partitioning level n (e.g., for each modulation level n, n=1 . . . N–1), the corresponding level n uncoded data portion may be encoded using a component code R(n) associated with the partitioning level n to generate the level n encoded data portion. That is, each level n encoded data portion may be mapped to the corresponding partitioning level n. Each level n encoded data portion may be modulated onto corresponding level n differential phase $Ø_k(n)$.

For the smallest set level (i.e., modulation level N), there may or may not a component code R(N) associated with the smallest set level. If there is an associated component code R(N), the level N uncoded data portion (also referred to as the "smallest set level uncoded data portion) may be encoded with the associated component code R(N) to generate the level N encoded data portion (also referred to as smallest set level encoded data portion) mapped to the smallest set level. If there is no component code R(N) or the component code R(N) perform no encoding process, then the level N uncoded data portion may be passed without changes as the level N encoded data portion mapped to the smallest set level. The level N encoded data portion (whether actually encoded or not) may be modulated onto the level N differential phase $Ø_k(N)$.

In the above example of FIG. 4A, P1=2 since there are two PSK subsets at partitioning level 1 in FIG. 4A. This means that the level 1 encoded data portion can include one bit to convey or otherwise indicate the differential phase or selection between the two level 1 PSK constellation subsets. In other words, the level 1 differential phase $Ø_k(1)$ may be represented with a single bit. For example, bit value zero (e.g., $Ø_k(1)=0$) may indicate/select subset 0 (e.g., 8PSK constellation subset with all even symbols of the original symbols) and bit value one (e.g., $Ø_k(1)=1$) may correspondingly indicate/select subset 1 (e.g., 8PSK constellation subset with all odd symbols of the original symbols).

Note that at partitioning level 1, d-min(1) is relatively small. This means that if the level 1 encoded data portion (i.e., data that determines the level 1 differential phase $Ø_k(1)$) is transmitted without strong protection, there is a substantial likelihood of receive error. To mitigate this likelihood of error, the component code R(1) used to encode the level 1 uncoded data portion into the level 1 encoded data portion may be very strong. This also implies that the corresponding coding rate 1 of the component code R(1) is very low (i.e., very slow). But with strong protection, the likelihood of receive error is reduced. In an aspect, at each partitioning level n, the strength of the component code R(n) may be such that likelihood of error E(n) is at or below some error threshold.

Then at partitioning level 1, it may then be said that the level 1 encoded data portion conveying $Ø_k(1)$ may be a result of applying a very strong component code R(1) to corresponding level 1 uncoded data portion. When the strongly protected level 1 encoded data portion is transmitted, the likelihood of receive error can be minimized (e.g., to at or below the error threshold) or even eliminated altogether (depending on the strength of the code). A tradeoff of such robust component code is that the coding rate is generally reduced.

Also as indicated, P2=2 since each PSK constellation subset of partitioning level 1 can have two PSK constellation subsets of their own in partitioning level 2 as seen in FIG. 4B. This means that level 2 encoded data portion can include one bit to convey or indicate the differential phase between subsets at partitioning level 2. In other words, the level 2 differential phase $Ø_k(2)$ may also be represented by a single bit. For example, if the 8PSK constellation subset with all even symbols was selected at partitioning level 1, then at level 2, then bit value zero (e.g., $Ø_k(2)=0$) may indicate/select subset 0 (e.g., 4PSK constellation subset with symbols (s(0), s(4), s(8), s(12))) and bit value one (e.g., $Ø_k(2)=1$) may correspondingly indicate/select subset 1 (e.g., 4PSK constellation subset symbols (s(2), s(6), s(10), s(14))).

The level 2 encoded data portion determining the level two differential phase $Ø_k(2)$ may be a result of protecting corresponding level 2 uncoded data portion with a component code R(2) associated with the partitioning level 2. However, note that the d-min(2) is bigger than d-min(1). This means that protection strength of R(2) can be weaker than R(1) and still achieve the same error threshold. As a result, the coding rate of component code R(2) may be higher than that of component code R(1).

Recall that in FIGS. 4A-4C, the smallest set level is 4PSK, i.e., Q=4. This means that the smallest set level is arrived at once the PSK constellation subset at partitioning level 2 is selected. Since there are four symbols, this means that the level N encoded data portion (smallest set level encoded data portion) can include two bits to convey or indicate differential phase between the symbols. That is, the level 3 differential phase $Ø_k(3)$ may also be represented with two bits, which may be coded or uncoded.

At the smallest set level, component code R(3), which is the weakest of all component codes, may be used to protect the level 3 uncoded data portion into corresponding level 3 encoded data portion. This is because d-min(3) is the highest among all d-mins. Indeed, if d-min(3) is sufficiently high, then the level 3 uncoded data portion may be transmitted with no protection. For example, noise in the channel between the source and destination apparatuses may be quiet/small enough such that even transmissions of unprotected level 3 uncoded data portion can be received without exceeding the prescribed error threshold. More generally, the component code of the smallest set level can be the weakest. In some instances, no protection may be provided at the smallest set level. Advantage of such weak component code R(3) is that even higher coding rate can be achieved relative to component codes R(1) and R(2). In general, strengths of the component codes R(n) associated with the partitioning levels may be such that for each partitioning level n, a code rate of the component code R(n) associated with the partitioning level n is lower than a code rate of the component code R(n+1) of the child level n+1.

As seen, the MLCM application to non-coherent (e.g., differential) modulation may be generally described as follows. Each modulation level (each partitioning level and smallest set level) may use different encoder/code rate for its level differential phase component protection. Each modulation level can have different resolution of phase rotations due to phases of the PSK constellation subsets (for partitioning levels) or due to positions of symbols (for smallest set level). Accordingly, different d-min(n) may be associated with each modulation level n. Based on the d-min(n), each modulation level may also be protected with component code R(n) corresponding to the d-min(n). Since d-min(n) increases starting from partitioning level 1, the corresponding code rate can also increase starting from partitioning level 1. That is, the code rate of the component code R(1) associated with partitioning level 1 may be the lowest and the code rate of the component code R(N) associated with the smallest set level may be the highest. Indeed, in some aspects, the component code R(N) may provide no protection.

In the example partitioning mechanism illustrated in FIGS. 4A-4C, there were two PSK constellation subsets to choose from in each partitioning level n, n=1, 2. However, it should be noted that there can be any number of PSK constellation subsets to choose at a modulation level. For example, at partitioning level 1, the 16PSK constellation illustrated in FIG. 4A could be divided into four level 1 PSK constellation subsets, with each subset comprising four of the original 16 PSK symbols. That is, P1=4. In this instance, the level 1 encoded data portion may include at least two encoded bits (to select among four subsets). The level 1 encoded data portion would be protected by component code R(1), which may or may not be the same component code described above where P1=2. Also in this instance, there would be no further subdivision after partitioning level 1.

Compared to the conventional approach of applying uniform protection, the proposed MLCM approach of applying different levels of protection can be more spectrally efficient. For the proposed MLCM approach, the number of information bits per channel may be expressed as follows:

$$infobits(MLCM) = \sum_{n=1}^{N-1} R(n)\log_2 Pn + R(N)\log_2 Q \quad (3)$$

In the conventional basic approach (uniform protection), the strongest component code R(1) (lowest code rate) is used. Then the number of information bits per channel may be expressed as follows for the conventional approach:

$$infobits(\text{conventional}) = R(1)\left(\sum_{n=1}^{N-1} \log_2 Pn + \log_2 Q\right) \quad (4)$$

It is seen that with the conventional approach, the component code R(1) with the lowest coding rate is used to code all uncoded bits of the raw information. But with the proposed MLCM approach, at least some uncoded bits are coded with higher coding rate component codes. The end result is that the proposed MLCM approach can provide more useful data within given resources, i.e., it can be more spectrally efficient. Moreover, the increased spectral efficiency can be achieved while maintaining an error rate that is at or below a prescribed threshold.

Once the total differential phase of $\emptyset_k$ is determined, then the transmitted symbol $s_k$ may be defined as follows:

$$s_k = s_{k-1} e^{i\emptyset_k} \quad (5)$$

The transmission modulation coding scheme (MCS) may be associated with the full list of following parameters already addressed above: MCS={M, N, {Pn}, Q, {R(n)}}. M may represent a modulation order of the M-ary phase shift keying (PSK) modulation such that $M=2^m$ in which m is a positive integer representing a total number of encoded bits of encoded data transmitted in the current symbol. N may represent a number of modulation levels. Pn may represent a number of level n PSK constellation subsets for each modulation level n, n=1 . . . N−1. R(n) represents a component code corresponding to each modulation level n, n=1 . . . N. Q represents a modulation order of modulation level N. It would be appreciated that the MCS is not limited to the illustrated parameters, for example, the parameter Q may be determined by M, N and {Pn}, and thus the parameter Q need not be included in the MCS parameter set, resulting MCS={M, N, {Pn}, {R(n)}}.

Figure 5:
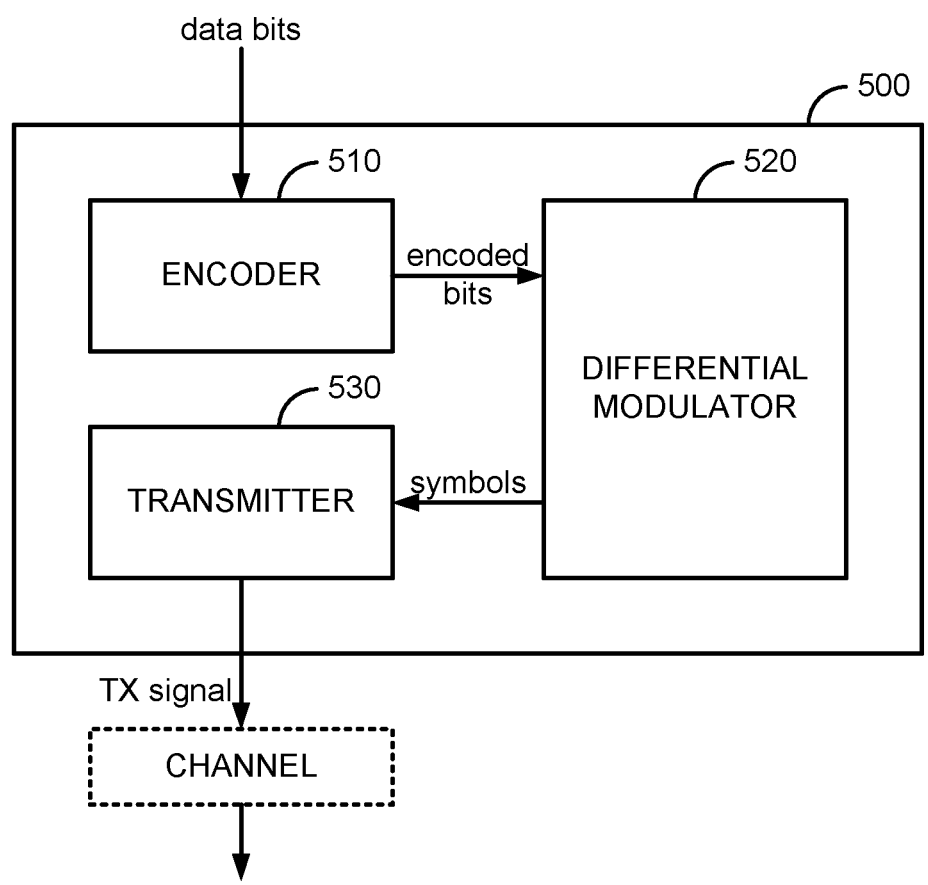
FIG. 5 illustrates an example of a source apparatus configured to perform non-coherent transmission, according to one or more aspects.

FIG. 5 illustrates a high level view of a source apparatus 500 configured to perform MLCM for non-coherent communication according to one or more aspects. The example source apparatus 500 may comprise an encoder 510, a differential modulator 520, and a transmitter 530. The encoder 510 may be configured to encode the uncoded bits of the raw information and output encoded bits, i.e., output the plurality of encoded data portions. The differential modulator 520 may be configured to transform the plurality of encoded data portions (the encoded bits) from the encoder 510 into symbols such as differential symbols. The transmitter 530 may be configured to transmit TX signal in a waveform in accordance with the symbols from the differential modulator 520. The TX signal may be transmitted over a channel to a destination apparatus. The transmitter 530 may be a part of a transceiver configured to perform both transmission and reception of wireless signals.

Figure 6:
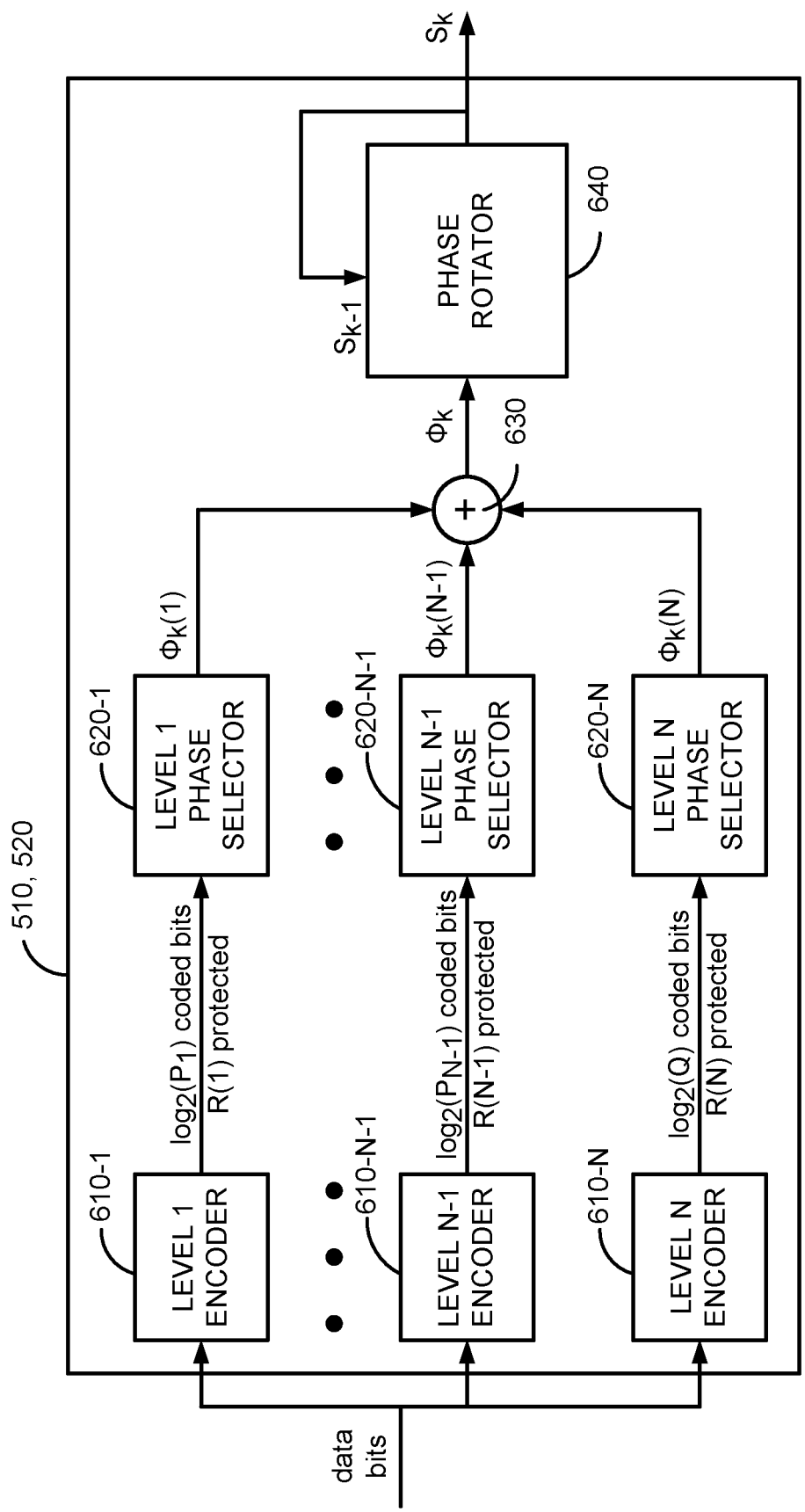
FIG. 6 illustrates an example of a encoder/modulator of a source apparatus, according to one or more aspects.

FIG. 6 illustrates a more detailed view of the encoder 510 and the differential modulator 520 according to one or more aspects. In an aspect, a data distributor 605 may also be included in FIG. 6 and positioned before each encoder. The data distributor 605 may distribute uncoded bits to each encoder in accordance with a code rate of a component code used in each encoder. As an example, the distribution may be conducted in units of bits included in an uncoded block. Based on the code rate of the component code used in each encoder, uncoded bits of an uncoded block may be divided into N level uncoded data portions in which each level n, n=1 . . . N uncoded data portion corresponds to each modulation level n. As another example, the distribution may be conducted in units of blocks. Based on the code rate of the component code used in each encoder, one or more of a plurality of uncoded blocks may be distributed to each encoder. It should be appreciated that other methods for distributing the uncoded data into the plurality of modulation levels are applicable. The encoder/differential modulator 510, 520 may include one or more level n encoders 610-n, where n corresponds to each modulation level including the smallest set level (modulation level N). The level n encoder 610-n for each partitioning level n, n=1 . . . N−1 may be configured to protect the level n uncoded data portion with a component code R(n) associated with the partitioning level n to generate corresponding level n encoded data portion. For example, the level 1 encoder 610-1 may protect the level 1 uncoded data portion with component code R(1) to generate the level 1 encoded data portion. At one or more modulation levels, the strength of the corresponding component code R(n) may be such that the receive error of the protected level n differential phase $\emptyset_k(n)$ is less than an error threshold. The level N encoder 610-N (for the smallest set level) may be configured to protect level N uncoded data portion with component code R(N). Alternatively, the level N encoder 610-N may simply pass the level N uncoded data portion (smallest set level uncoded data portion) without encoding.

In an aspect, strength of component code R(n) associated with modulation level n may be less than or equal to strength of component code R(n−1) associated with parent level n−1. Equivalently, code rate of component code R(n) may be greater than or equal to code rate of component code R(n−1). This means that R(1) can be the most robust (lowest coding rate) and R(N) can be the least protective (highest coding rate). Indeed, in some instances, R(N) may equate to no protection assuming channel conditions are favorable. Each level n encoder 610-*n* may be configured to output appropriately protected level n encoded data portion to convey the level n differential phase $\emptyset_k(n)$.

The encoder/differential modulator 510, 520 may also include one or more level n phase selectors 620-*n* corresponding to each modulating level n, n=1 . . . N. Each level n phase selector 620-*n*, n=1 . . . N−1 may receive the level n encoded data portion from the corresponding level n encoder 610-*n*. The level N phase selector 620-N (for the smallest set level) may receive the level N data portion, which may be encoded or uncoded data portion, from the level N encoder 610-N. Each level n phase selector 620-*n*, n=1 . . . N may generate the level n differential phase $\emptyset_k(n)$ based on the received level n encoded data portion.

The encoder/differential modulator 510, 520 may further include a phase accumulator 630 and a phase rotator 640. The phase accumulator 630 may be configured to sum the individual level n differential phases $\emptyset_k(1) \ldots \emptyset_k(N)$ to generate or otherwise determine the total differential phase $\emptyset_k$ (e.g., see equation (2)). The phase rotator 640 may generate the current symbol $s_k$ based on the previous symbol $s_{k-1}$ and the total differential phase $\emptyset_k$ (e.g., see equation (5)). In short, the current symbol $s_k$ may be a differentially modulated symbol.

Recall that the component code R(N) can be very weak. Indeed, in some instances, there may be no protection at smallest set level. In such instances, the level N uncoded bits of the level N uncoded data portion may be provided directly to the level N phase selector 620-N without being encoded. In other words, the level N encoder 610-N may be optional. The level N bits may be used to refer to the one or more bits of the level N data portion modulated on the level N differential phase $\emptyset_k(N)$. The level N data bits may be coded or uncoded.

The following is to be noted regarding FIG. 6. It is of course contemplated that the some or all components of FIG. 6 can be implemented physically in hardware. For example, there can physically be N encoders 610 and/or N phase selectors 620. However, this is not a requirement. That is, the FIG. 6 may be viewed as illustrating logical components, and their physical implementations may be accomplished in a variety of ways. For example, the components may be implemented through a combination of hardware and software including processor(s) and/or transceiver(s) executing instructions stored in memory of an apparatus, such as the source apparatus 302 illustrated in FIG. 3.

Also, even if the components are implemented physically in hardware or as combination of hardware and software, the number of actual components can be less than illustrated in FIG. 6. For example, a single differential phase selector 620 may be used in place of the multiple level n phase selectors 620-1 to 620-N and the phase accumulator 630. Referring to the structure of FIG. 6, for a first set of m bits to be conveyed on the current modulation symbol $s_k$, a first total differential phase may be obtained at the output of phase accumulator 630 after the operation of the multiple level n phase selectors 620-1 to 620-N and the phase accumulator 630; similarly for a second different set of m bits to be conveyed on the current modulation symbol $s_k$, a second different total differential phase may be obtained at the output of phase accumulator 630 after the operation of the multiple level n phase selectors 620-1 to 620-N and the phase accumulator 630; and similarly for an n'th different set of m bits to be conveyed on the current modulation symbol $s_k$, an n'th different total differential phase may be obtained at the output of phase accumulator 630 after the operation of the multiple level n phase selectors 620-1 to 620-N and the phase accumulator 630, where n=1 to M, m=$\log_2$ M, and M represents a modulation order of the M-ary phase shift keying (PSK) modulation.

It would be appreciated that for M different bit sets each including m bits, M different total differential phases may be obtained through the operation of the multiple level n phase selectors 620-1 to 620-N and the phase accumulator 630, therefore a lookup table, including the M different bit sets each including m bits and the M different total differential phases corresponding respectively to the M different bit sets, may be used in the single total differential phase selector 620 to select a total differential phase for a specific bit set, among the M bit sets, to be conveyed on the current modulation symbol $s_k$. It would be appreciated that the selected differential phase contains information of respective level n differential phases, or in other words, may be decomposed into respective level n differential phases of the N levels.

At the receive side, e.g., at the destination apparatus, the MLCM application may generally include performing sequential multi-layered differential decoding on a symbol $s_k'$ received from the source apparatus. The received symbol $s_k'$ may represent the current symbol $s_k$ that has been differentially modulated from the previous symbol $s_{k-1}$ to convey data. The sequential multi-layered differential decoding may generally include the following: (A) perform differential decode/demodulation on first partitioning level, i.e., on partitioning level 1; (B) perform differential decode/demodulation on subsequent partitioning levels if any; and (C) Perform differential decode/demodulation on the smallest set level, i.e., on modulation level N. In this way, the full vector of decoded bits contributed by the received symbol $s_k'$ may be composed/reassembled.

Regarding (A), differential decode/demodulation on the partitioning level 1 may include the following:

Detect first PSK constellation subset from M-ary PSK constellation based on received symbol $s_k'$;

Determine first differential phase $\emptyset_k'(1)$ as a phase difference between the first PSK constellation subset and level 1 PSK constellation subset of previous symbol $s_{k-1}$;

Extract level 1 encoded data portion from first differential phase $\emptyset_k'(1)$;

Decode level 1 encoded data portion into corresponding level 1 decoded data portion using the component code R(1);

Re-encode level 1 decoded data portion using the component code R(1);

Associate level 1 re-encoded data portion with level 1 differential phase $\emptyset_k(1)$ protected by component code R(1);

Regarding (B), differential decode/demodulation on each partitioning level n from n=2 to N−1 (when there are other partitioning levels) may include the following:

Detect n'th PSK constellation subset from level n PSK constellation set based on received symbol $s_k'$, the n'th PSK constellation set being a level n−1 PSK constellation subset selected at parent level n−1;

Determine n'th differential phase $\emptyset_k'(n)$ as a phase difference between the n'th PSK constellation subset and level n constellation subset of previous symbol $s_{k-1}$;

Extract level n encoded data portion from n'th differential phase $\emptyset_k'(n)$;

Decode level n encoded data portion into corresponding level n decoded data portion using the component code R(n);

Re-encode level n decoded data portion using the component code R(n);

Associate level n re-encoded data portion with level n differential phase $\emptyset_k(n)$ protected by component code R(n);

Repeat until smallest set level (modulation level N) is reached.

Regarding (C), differential decode/demodulation on the smallest set level may include the following:

Get level N−1 PSK constellation subset selected at parent level of the smallest set level as the smallest PSK constellation set;

Detect nearest symbol from smallest PSK constellation set as current symbol $s_k$ based on the received symbol $s_k'$, the smallest PSK constellation set being a level N−1 constellation subset selected at parent partitioning level N−1, in which the constellation is pointed by component code protected sequentially selected subsets $\emptyset_k(1), \ldots, \emptyset_k(N-1)$;

Determine total differential phase $\emptyset_k$ of current symbol $s_k$ relative to previous symbol $s_{k-1}$;

Calculate level N differential phase $$\emptyset_k(N) = \emptyset_k - \sum_{n=1}^{N-1} \emptyset_k(n);$$

Extract level N data portion from level N differential phase $\emptyset_k(N)$;

If level N data portion (smallest set level data portion) comprises level N encoded bits, decode level N data portion into corresponding level N decoded data portion (smallest set level decoded data portion) using component code R(N);

Compose (reassemble) full vector of decoded information bit(s) contributed by current symbol $s_k$.

Figure 7:
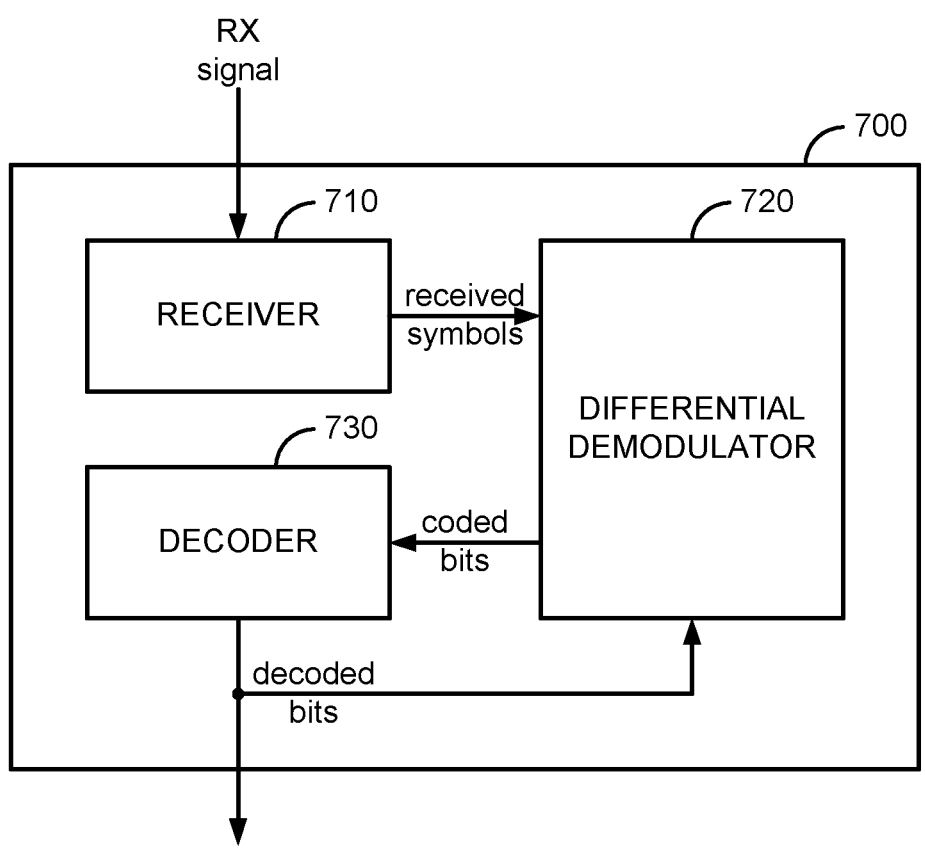
FIG. 7 illustrates an example of a destination apparatus configured to perform non-coherent reception, according to one or more aspects.

FIG. 7 illustrates a high level view of a destination apparatus 700 configured to perform MLCM for non-coherent communication according to one or more aspects. The example destination apparatus 700 may comprise a receiver 710, a differential demodulator 720, and a decoder 730. The receiver 710 may be configured to receive an RX signal over a channel from a source apparatus and output a received symbol $s_k'$. In an aspect, the receiver 710 may be a part of a transceiver configured to perform both transmission and reception of wireless signals. The differential demodulator 720 may be configured to demodulate or otherwise convert the symbols from the receiver 710 into encoded data portion. The decoder 730 may be configured to decode the encoded data portion and output the corresponding decoded data portion.

Figure 8:
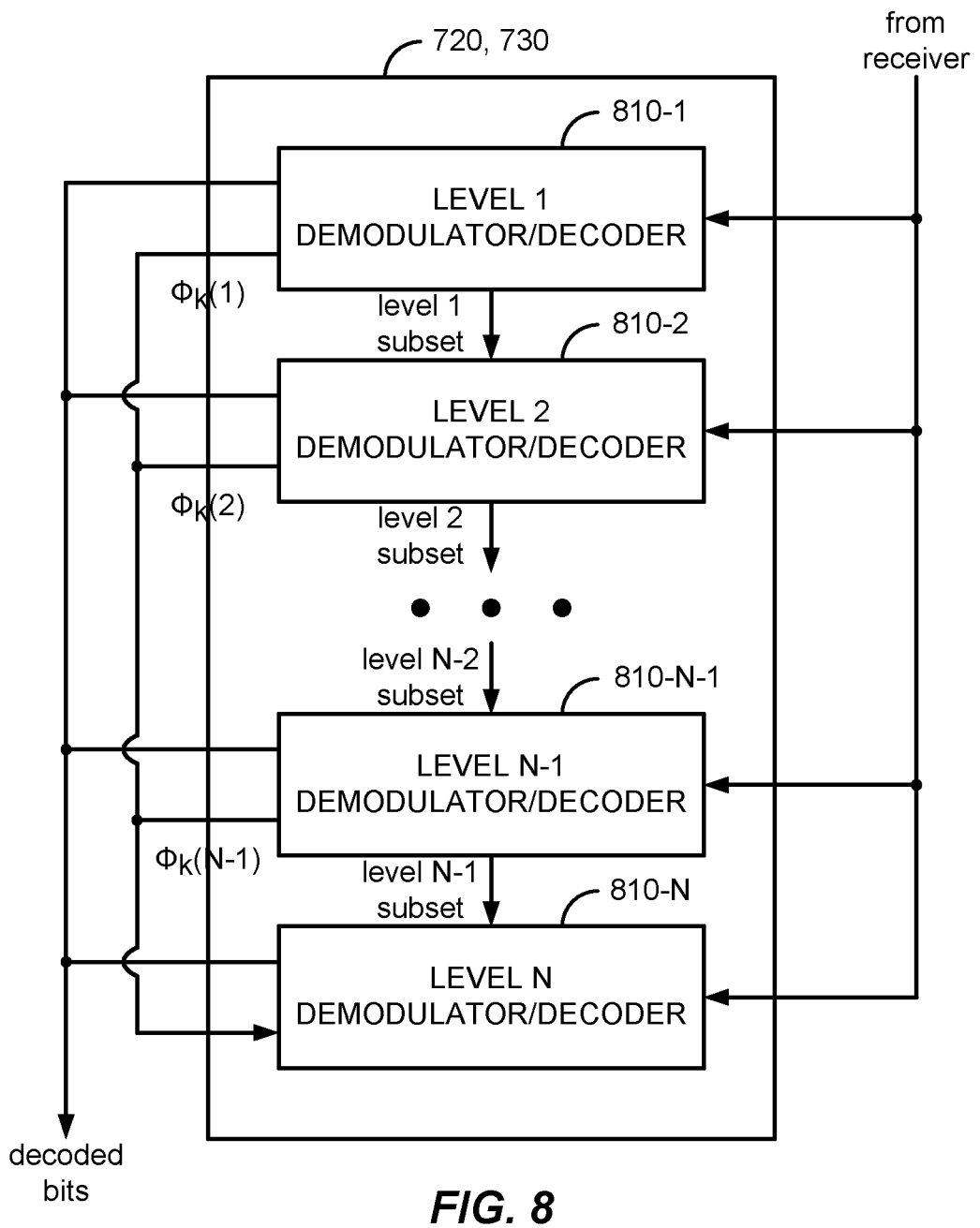
FIG. 8 illustrates an example of a demodulator/decoder of a destination apparatus, according to one or more aspects.

FIG. 8 illustrates a more detailed view of the differential demodulator 720 and the decoder 730 according to one or more aspects. The differential demodulator and decoder 720, 730 may include one or more level n demodulator/decoder 810-n (collectively demodulator/decoders 810), where n corresponds each modulation level n including the smallest set level (modulation level N). The demodulator/decoder 810-n for each modulation level n may be configured to receive symbols, e.g., from the receiver 710, and output level n decoded data portion corresponding to the modulation level n. Each level n decoded data portion may comprise a portion of the decoded bits of the decoded information Before proceeding further, the following concepts are included for descriptive purposes. At the destination side, the received symbols may be demodulated to extract the encoded block, which then may be decoded into a corresponding decoded block comprising some number of decoded bits (a plurality of decoded bits). The decoded bits of the decoded block may be divided into N level decoded data portions in which each level n, n=1 . . . N decoded data portion corresponds to each modulation level n. Each level n decoded data portion may comprise a portion of the decoded bits of the decoded block, i.e., each level n decoded data portion may comprise one or more decoded bits of the decoded block. The one or more decoded bits of each level n decoded data portion may be referred to as level n decoded bits. The decoded block may be represented as a sum of all level n decoded data portions, implying that each decoded bit of the decoded block is in at least one level n decoded data portion.

Recall that at the source apparatus, each level n differential phase $\emptyset_k(n)$ is individually modulated with corresponding level n encoded data portion. At the destination apparatus, individual demodulations may be performed to extract the level n encoded data portion from the received symbol, and the each extracted level n encoded data portion may be decoded to generate the corresponding level n decoded data portion. A desirable outcome is that after the decoding is performed, each level n decoded data portion at the destination apparatus is the same as the corresponding level n uncoded data portion at the source apparatus.

Ideally, each level n encoded data portion extracted at the destination apparatus is identical to the corresponding level n encoded data portion modulated at the source apparatus. However, due to channel noise, at least some extracted level n encoded data portions are unlikely to be the same. Nonetheless, if the component codes R used to protect the level encoded data portions are sufficiently strong, then the decoded data portions at the destination apparatus should be the same as the uncoded data portions at the source apparatus.

As indicated above on multiple occasions, different modulation levels have different tolerances to noise in the channel (smaller d-min, less noise tolerance). Thus, it is proposed to have different protection levels for the different modulation levels. For modulation levels with relatively small tolerances (e.g., portioning level 1), strong component codes (low code rates) may be used. For modulation levels with relatively large tolerances (e.g., smallest set level), weak component codes (high code rates) may be used.

Indeed, if the modulation level has a sufficiently large tolerance (e.g., smallest set level), no protection may be needed.

Also, as will be shown below, the decoded block may be re-encoded into a re-encoded block comprising some number of re-encoded bits (at least a plurality of re-encoded bits). The re-encoded block may be used to select the level n PSK constellation subsets at each partitioning levels n, n=1 . . . N−1. The re-encoded bits of the re-encoded block may be divided into N level re-encoded data portions in which each level n, n=1 . . . N re-encoded data portion corresponds to each modulation level n. Each level n re-encoded data portion may comprise a portion of the re-encoded bits of the re-encoded block, i.e., each level n re-encoded data portion may comprise one or more re-encoded bits of the re-encoded block. The one or more re-encoded bits of each level n re-encoded data portion may be referred to as level n re-encoded bits. The re-encoded block may be represented as a sum of all level n re-encoded data portions, implying that each re-encoded bit of the re-encoded block is in at least one level n re-encoded data portion.

For each partitioning level n, n=1 . . . N−1, the corresponding level n demodulator/decoder 810-*n* may select a level n PSK constellation subset and provide the selected subset to the next (i.e., child) level, which may be another partitioning level or the smallest set level. Also for each partitioning level n, n=1 . . . N−1, the corresponding level n demodulator/decoder 810-*n* may determine the level n differential phase $Ø_k(n)$ and provide the level n differential phase $Ø_k(n)$ to the level N demodulator/decoder 810-N (also referred to as smallest set level demodulator/decoder). The level N demodulator/decoder 810-N may determine the level N differential phase $Ø_k(N)$ based on the level n differential phases $Ø_k(n)$ received from all of the partitioning levels.

In an aspect, the demodulator/decoders 810 may include at least one level 1 demodulator/decoder 810-1 (corresponding to partitioning level 1) and the level N demodulator/decoder 810-N (corresponding to smallest set level). In some aspects, the demodulator/decoders 810 may also include one or more intermediate level n demodulator/decoders 810-*n*, n=2 . . . N−1 (corresponding to other partitioning levels).

Figure 9A:
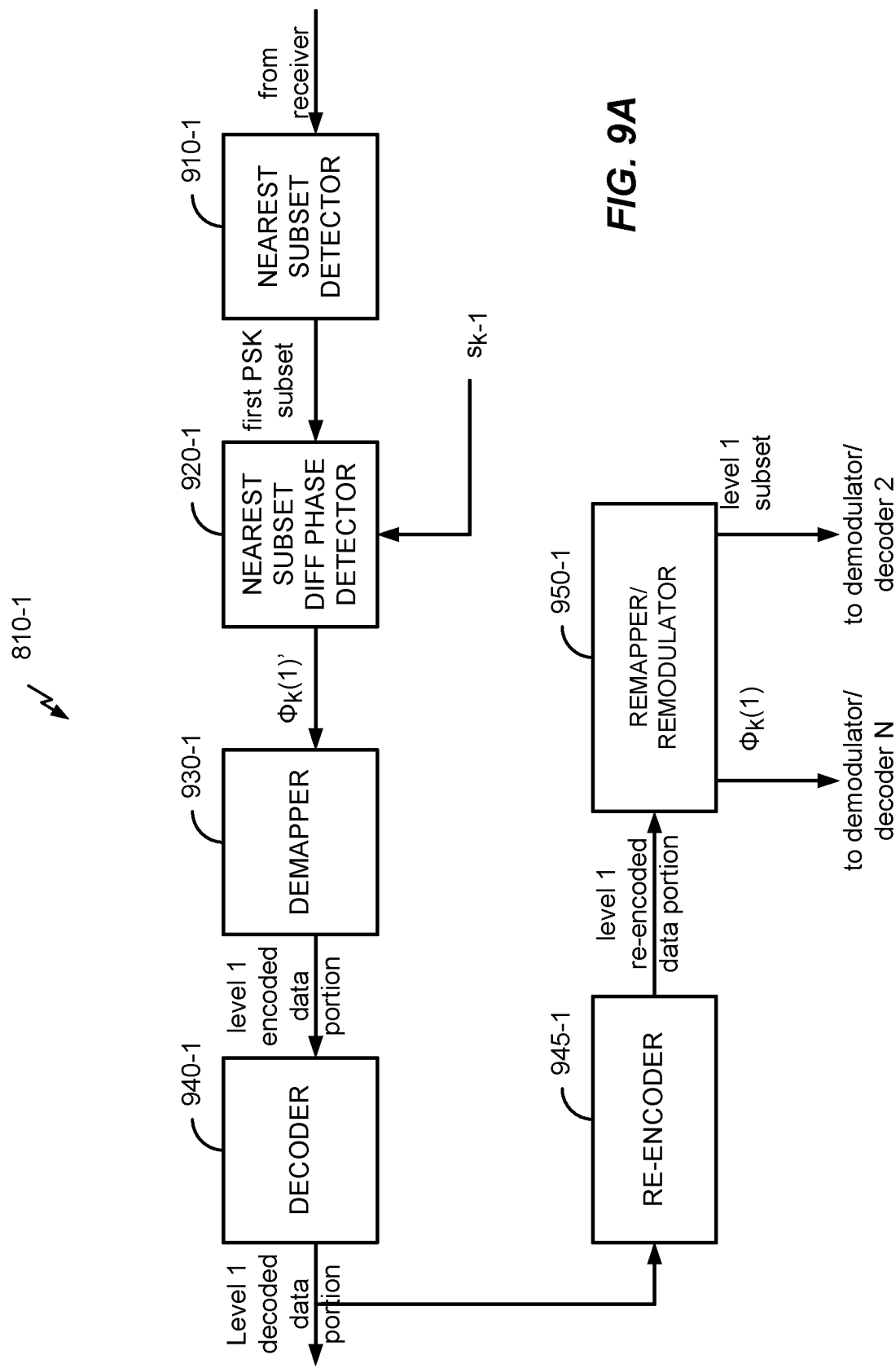
FIG. 9A illustrates an example of a level 1 demodulator/decoder of a destination apparatus configured to demodulate and decode data of partitioning level 1, according to various aspects.

FIG. 9A illustrates an example implementation of the level 1 demodulator/decoder 810-1. The level 1 demodulator/decoder 810-1 may include a nearest subset detector 910-1, a nearest subset differential phase detector 920-1, a demapper 930-1, a decoder 940-1, a re-encoder 945-1, and a remapper/remodulator 950-1.

The nearest subset detector 910-1 may be configured to receive one or more symbols from the receiver 710. Based on the received symbol $s_k'$, the nearest subset detector 910-1 may be configured to detect a first PSK constellation subset among the plurality of level 1 PSK constellation subsets of the M-ary PSK constellation. In an aspect, the first PSK constellation subset may be defined as the level 1 PSK constellation subset whose member symbol is closest (e.g., in Euclidian distance) to the received symbol $s_k'$ among all symbols of the level 1 PSK constellation set (among all symbols of the M-ary PSK constellation). That is, the first PSK constellation subset may be the level 1 PSK constellation subset that is nearest to the received symbol $s_k'$ among the plurality of level 1 PSK constellation subsets of the M-ary PSK constellation. For example, in relation to the example illustrated in FIG. 4A, assume that a received symbol (not shown) is closest to symbol s(11) among all 16PKS symbols. In this instance, PSK subset 1 would be selected as the first PSK constellation subset since the closest symbol is a member of PSK subset 1.

In operation, the nearest subset detector 910-1 may determine level 1 decision bit(s) from the received symbol $s_k'$, and then select the first PSK constellation subset based on the level 1 decision bit(s). In one aspect, the level 1 decision bit(s) may be hard decision bit(s). Alternatively, the level 1 decision bit(s) may be soft decision bit(s) (e.g., based on log likelihood ratio (LLR)).

In FIG. 9A, the nearest subset differential phase detector 920-1 may be configured to determine a first differential phase $Ø_k'(1)$ of the first PSK constellation subset. The first differential phase $Ø_k'(1)$ may represent a phase difference between the first PSK constellation subset of the received symbol $s_k'$ and the level 1 PSK constellation subset of the previous symbol $s_{k-1}$. For example, again in the example illustrated in FIG. 4A, if the level 1 PSK constellation subset of the previous symbol $s_{k-1}$ was PSK subset 0 and the first PSK constellation subset of the received symbol $s_k'$ is PSK subset 1, then the first differential phase may be determined as $Ø_k(1)=\pi/8$.

In FIG. 9A, the demapper 930-1 may be configured to extract level 1 encoded data portion from the first differential phase $Ø_k(1)$. The decoder 940-1 may be configured to decode the extracted level 1 encoded data portion and output corresponding level 1 decoded data portion. The decoder 940-1 may be configured to decode the level 1 encoded data portion using the component code R(1), i.e., using the component code associated with partitioning level 1. The decoder 940-1 may be a counterpart to the level 1 encoder 610-1 (see e.g., FIG. 6).

The level 1 decoded data portion may be used to select the level 1 PSK constellation subset and to determine the level 1 differential phase $Ø_k(1)$ of the partitioning level 1. In particular, the re-encoder 945-1 may be configured to re-encode the level 1 decoded data portion into corresponding level 1 re-encoded data portion. In an aspect, the re-encoder 945-1 may perform the same or similar coding operations as the level 1 encoder 610-1 of FIG. 6. For example, the re-encoder 945-1 may re-encode the level 1 decoded data portion using the component code R(1).

The remapper/remodulator 950-1 may be configured to determine the level 1 differential phase $Ø_k(1)$ and select the level 1 PSK constellation subset based on the level 1 re-encoded data portion. For example, the remapper/remodulator 950-1 may perform the same or similar operations as the level 1 phase selector 620-1 of FIG. 6. The remapper/remodulator 950-1 may be configured to provide the level 1 differential phase $Ø_k(1)$ to the level N demodulator/decoder 810-N (to the smallest set level demodulator/decoder). The remapper/remodulator 950-1 may be also configured to provide the selected level 1 PSK constellation subset to the next modulation level (to partitioning level 2 or to smallest set level (if there are no other partitioning levels)).

In an aspect, note that determining the level 1 differential phase $Ø_k(1)$ may effectively determine which of the level 1 PSK constellation subsets will be selected. For example, if the level 1 differential phase $Ø_k(1)=0$, this indicates that selected level 1 PSK constellation subsets of the current and previous symbol $s_k$ and $s_{k-1}$ will be the same. If the level 1 differential phase $Ø_k(1) \neq 0$, this indicates that the level 1 PSK constellation subset selected for the current symbol $s_k$ will be different from the level 1 PSK constellation subset of the previous symbol $s_{k-1}$. Also, the selected level 1 PSK constellation subset will reflect the level 1 differential phase $Ø_k(1)$. That is, the level 1 differential phase $Ø_k(1)$ may represent a phase difference between the selected level 1 PSK constellation subset and the level 1 PSK constellation subset of the previous symbol $s_{k-1}$.

Recall that the level 1 encoded data portion is a result of encoding with very strong component code R(1). Therefore, even if one or more errors were introduced in the receive path prior to the decoder 940-1 (e.g., channel between the source and destination apparatuses may be noisy), since the component code R(1) is relatively strong, it may be generally expected that level 1 decoded data portion generated by the decoder 940-1 are correct, i.e., is the same as the level 1 uncoded data portion at the source apparatus. As such, there can be a high level of confidence that the level 1 PSK constellation subset and the level 1 differential phase $Ø_k(1)$ determined by the remapper/remodulator 950-1 are also correct.

Figure 9B:
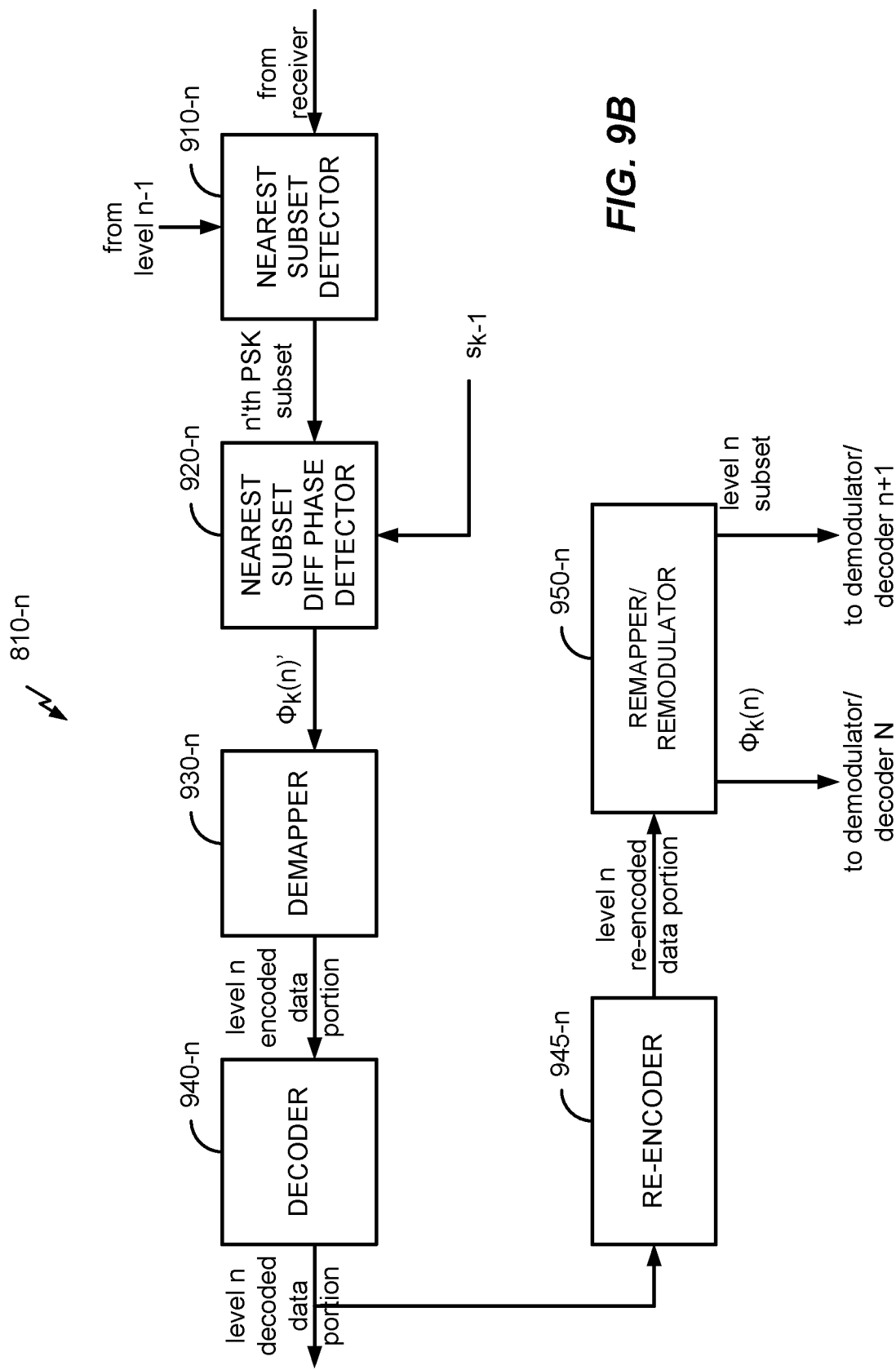
FIG. 9B illustrates an example of a level n demodulator/decoder of a destination apparatus configured to demodulate and decode data of partitioning levels n other than partitioning level 1, according to various aspects.

FIG. 9B illustrates an example implementation of level n demodulator/decoder 810-n where n=2 . . . N–1, i.e., the level n demodulator/decoder 810-n of partitioning levels other than partitioning level 1. The level n demodulator/decoder 810-n may include a nearest subset detector 910-n, a nearest subset differential phase detector 920-n, a demapper 930-n, a decoder 940-n, a re-encoder 945-n, and a remapper/remodulator 950-n.

Unlike FIG. 9A, the nearest subset detector 910-n may get the PSK constellation subset selected at an ancestor modulation level. For example, it may get a level n–1 PSK constellation subset selected at partitioning level n–1 (at parent level) as the level n PSK constellation set of the partitioning level n. The nearest subset detector 910-n may also receive one or more symbols from the receiver 710. Based on the received symbol $s_k'$, the nearest subset detector 910-n may be configured to detect an n'th PSK constellation subset among the plurality of level n PSK constellation subsets of partitioning level n. The n'th PSK constellation subset may be the level n PSK constellation subset whose member symbol is closest (e.g., in Euclidian distance) to the received symbol $s_k'$ among all symbols of the level n constellation. That is, the n'th PSK constellation subset may be the level n PSK constellation subset that is nearest to the received symbol $s_k'$ among the plurality of level n PSK constellation subsets of the level n PSK constellation set In operation, the nearest subset detector 910-n may determine level n decision bit(s) from the received symbol $s_k'$, and then select the n'th PSK constellation subset based on the level n decision bit(s). The level n decision bit(s) may be hard decision bit(s). Alternatively, the level n decision bit(s) may be soft decision bit(s) (e.g., based on log likelihood ratio (LLR)).

The nearest subset differential phase detector 920-n may be configured to determine an n'th differential phase $Ø_k'(n)$ of the n'th PSK constellation subset. The n'th differential phase $Ø_k'(n)$ may represent a phase difference between the n'th PSK constellation subset of the received symbol $s_k'$ and the level n PSK constellation subset of the previous symbol $s_{k-1}$.

The demapper 930-n may be configured to extract level n encoded data portion from the n'th differential phase $Ø_k'(n)$. The decoder 940-n may be configured to decode the extracted level n encoded data portion and output corresponding level n decoded data portion. The decoder 940-n may be configured to decode the level n encoded data portion using component code R(n) associated with partitioning level n. Each decoder 940-n may be a counterpart to one of the level n encoders 610-n (see e.g., FIG. 6).

The level n decoded data portion may be used to select the level n PSK constellation subset and to determine the level n differential phase $Ø_k(n)$. For example, the re-encoder 945-n may be configured to re-encode the level n decoded data portion into corresponding level n re-encoded data portion, e.g., by using the associated component code R(n). In an aspect, the re-encoder 945-n may perform the same or similar coding operations as the level n encoder 610-n of FIG. 6.

The remapper/remodulator 950-n may be configured to determine the level n differential phase $Ø_k(n)$ and select the level n PSK constellation subset based on the level n re-encoded data portion. For example, the remapper/remodulator 950-n may perform the same or similar operations as the level n phase selector 620-n of FIG. 6. The remapper/remodulator 950-n may be configured to provide the level n differential phase $Ø_k(n)$ to the level N demodulator/decoder 810-N (to the smallest set level demodulator/decoder). The remapper/remodulator 950-n may be also configured to provide the selected level n PSK constellation subset to the next modulation level (to partitioning level n+1 or to smallest set level (if there are no other partitioning levels)).

Similar to level 1, determining the level n differential phase $Ø_k(n)$ may effectively determine which of the level n PSK constellation subsets will be selected. Also, the selected level n PSK constellation subset should reflect the level n differential phase $Ø_k(n)$. That is, the level n differential phase $Ø_k(n)$ may represent a phase difference between the selected level n PSK constellation subset and the level n PSK constellation subset of the previous symbol $s_{k-1}$.

Again, it is expected that level n decoded data portion generated by the decoder 940-n are correct. As such, there can be a high level of confidence that the level n PSK constellation subset and the level n differential phase $Ø_k(n)$ determined by the remapper/remodulator 950-n are also correct.

Figure 9C:
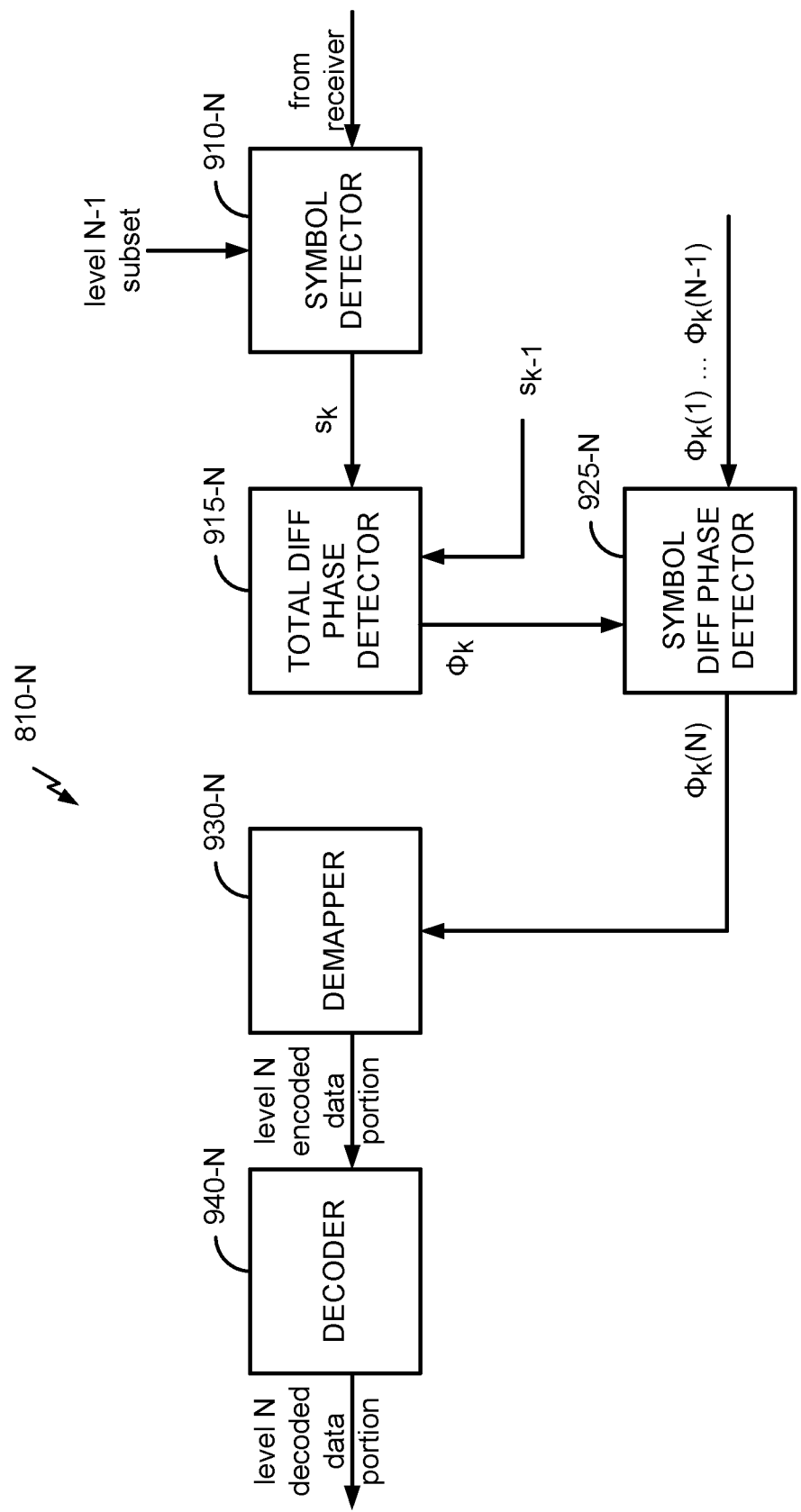
FIG. 9C illustrates an example of a smallest set level (level N) demodulator/decoder of a destination apparatus configured to demodulate and decode data of the smallest set level, according to various aspects.

FIG. 9C illustrates an example implementation of the level N demodulator/decoder 810-N, i.e., the demodulator/decoder of the smallest set level. The level N demodulator/decoder 810-N may include a symbol detector 910-N, a total differential phase detector 915-N, a symbol differential phase detector 925-N, a demapper 930-N, and a decoder 940-N.

The symbol detector 910-N may be configured to get the level N–1 constellation subset selected at the parent partitioning level N–1 as level N PSK constellation (smallest PSK constellation set). The symbol detector 910-N may also be provided with the received symbol $s_k'$ from the receiver 710. Based on the received symbol $s_k'$, the symbol detector 910-N may be configured to detect a symbol from the smallest PSK constellation set as the current symbol $s_k$. For example, the symbol detector 910-N may select a nearest symbol, which may be defined as the symbol among the plurality of symbols of the smallest PSK constellation set that is closest (e.g., in Euclidian distance) to the received symbol $s_k'$. In one or more aspects, the nearest symbol may be determined to be the current symbol $s_k$.

The symbol detector 910-N may determine level N decision bit(s) (smallest set level decision bit(s)) from the received symbol $s_k'$, and select the nearest symbol based on the level N decision bit(s). The level N decision bit(s) may be hard decision bit(s). Alternatively, the level N decision bit(s) may be soft decision bit(s) (e.g., based on log likelihood ratio (LLR)).

Based on the current and previous symbols $s_k$, $s_{k-1}$, the total differential phase detector 915-N may be configured to determine the total differential phase $Ø_k$. The symbol differential phase detector 925-N may receive the total differential phase $\emptyset_k$ from the total differential phase detector 915-N. The symbol differential phase detector 925-N may also receive the level n differential phases $\emptyset_k(n)$, n=1 . . . N−1 from each of the partitioning levels. The symbol differential phase detector 925-N may be configured to determine the level N differential phase $\emptyset_k(N)$ (smallest set level differential phase) based on the total differential phase $\emptyset_k$ and on the level n differential phases $\emptyset_k(n)$, n=1 . . . N−1. The level N differential phase $\emptyset_k(N)$ may be expressed as follows (see also equation (2)):

$$\emptyset_k(N) = \emptyset_k - \sum_{n=1}^{N-1} \emptyset_k(n) \qquad (5)$$

The demapper 930-N may be configured to extract level N data portion, which may be coded or uncoded, from the level N differential phase $\emptyset_k(N)$. If the bits of the level N data portion are coded (e.g., if the level N data portion is the level N encoded data portion), the decoder 940-N may be configured to decode the extracted level N encoded data portion based on the component code R(N) and output the corresponding level N decoded data portion. The decoder 940-N may be a counterpart to the smallest set level encoder 610-N (see e.g., FIG. 6). Recall that the component code R(N) can be very weak. Indeed, in some instances, there may be no protection at the smallest set level, and the extracted level N data portion may not be coded. In such instances, the output of the demapper 930-N may suffice as the level N decoded data portion, and the decoder 940-N may not be necessary. In other words, the decoder 940-N may be optional.

The following is to be noted regarding FIGS. 8 and 9A-9C. It is of course contemplated that the some or all components of these figures can be implemented physically in hardware. For example, there can physically be N demodulator/decoders 810. However, this is not a requirement. That is, the FIGS. 8 and 9A-9C may be viewed as illustrating logical components, and their physical implementations may be accomplished in a variety of ways. For example, the components may be implemented through a combination of hardware and software including processor(s) and/or transceiver(s) executing instructions stored in memory of an apparatus, such as the destination apparatus 304 illustrated in FIG. 3.

Also, even if the components are implemented physically in hardware or as combination of hardware and software, the number of actual components can be less than illustrated in FIGS. 8 and 9A-9C. Again, due to the sequential nature of demodulating and decoding, the number of demodulator/decoders 810 can be less than N.

Figure 10A:
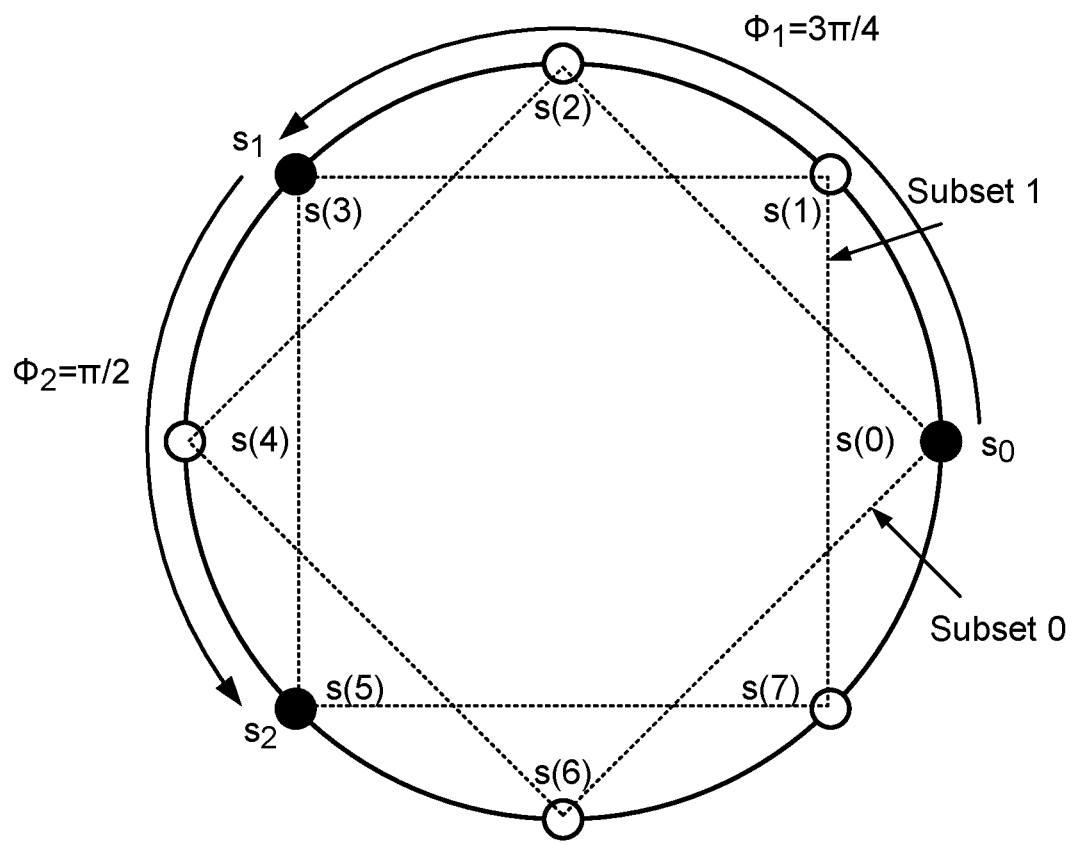
FIG. 10A illustrates a specific example of transmitting a current symbol whose phase has been rotated by a total differential phase from a previous symbol, according to one or more aspects.

An example of differential MLCM operation will be described with reference to FIGS. 10A-10B. FIG. 10A illustrates the transmit side (e.g., source apparatus) operation. Note that an apparatus (e.g., UE, mobile terminal, etc.) may be a source apparatus in one moment and may be a destination apparatus in another moment.

From the initial symbol $s_0=0$, the source apparatus transmits symbol $s_1$ that is rotated from $s_0$ by total differential phase $\emptyset_1=3\pi/4$. That is, the source apparatus transmits $s_1=s_0 e^{\emptyset_1}$. Thereafter, the source apparatus transmits symbol $s_2$ that is rotated from $s_1$ by total differential phase $\emptyset_2=\pi/2$. That is, the source apparatus transmits $s_2=s_1 e^{\emptyset_2}$.

In FIG. 10A, two modulation levels (N=2), i.e., partitioning level 1 and smallest set level for original 8PSK (M=8) constellation is assumed. In particular, the original 8PSK constellation is assumed to be divided into two 4PSK constellation subsets (P1=2). As seen, the PSK constellation subset 0 is a 4PSK constellation with symbols (s(0), s(2), s(4), s(6)) and PSK constellation subset 1 is a 4PSK constellation with symbols (s(1), s(3), s(5), s(7)). Again, each 4PSK constellation subset is assumed to be at the smallest set level (Q=4).

Since there are two modulation levels, then each total differential phase $\emptyset_k$ can be represented as a cumulative rotations at each modulation level, i.e., $\emptyset_k=\emptyset_k(1)+\emptyset_k(2)$. At modulation level 1 (at partitioning level 1), since P1=2, then the level 1 encoded data portion conveys level 1 differential phase $\emptyset_k(1)$, which has two options (0, π/4). In effect, the level 1 encoded data portion selects either PSK subset 0 or subset 1. At modulation level 2 (at smallest set level), since Q=4, then the level 2 encoded data portion conveys level 2 differential phase $\emptyset_k(2)$, which has four options (0, π/2, π, 3π/2). This means that the total differential phase $\emptyset_k=\emptyset_k(1)+\emptyset_k(2)$ has eight options (0, π/4, π/2, 3π/4, π, 5π/4, 3π/2, 7π/4).

The level 1 encoded data portion from the level 1 encoder 610-1 are converted to level 1 differential phase $\emptyset_k(1)$ by the level 1 phase selector 620-1. Also, the level 2 encoded data portion (may or may not be actually encoded) from the level 2 encoder 610-2 is converted to level 2 differential phase $\emptyset_k(2)$ by the level 2 phase selector 620-2. The phase accumulator 630 determines the total differential phase $\emptyset_k=\emptyset_k(1) \emptyset_k(2)$, and the phase rotator 640 generates symbol $s_k$ based on the previous symbol $s_{k-1}$ and the total differential phase $\emptyset_k$.

The level 1 encoded data portion is protected with component code R(1) and the level 2 encoded data portion is protected with component code R(2). The component code R(1) are assumed to be stronger than the component code R(2). Conversely, coding rate of R(1) are lower than coding rate of R(2). Indeed, R(2) may provide no protection (e.g., the bits of the level 2 encoded data portion may be uncoded).

In the scenario of FIG. 10A, when determining total differential phase $\emptyset_1=\emptyset_1(1)+\emptyset_1(2)$, $s_1$ and $s_0$ respectively are current and previous symbols. Regarding level 1 differential phase $\emptyset_1(1)$, note that previous symbol $s_0$ is part of PSK constellation subset 0 and current symbol $s_1$ is part of PSK constellation subset 1. Thus, the level 1 encoded data portion from the level 1 encoder 610-1 indicates a change in the subset. Since there is a change of subset at partitioning level 1, the level 1 phase selector 620-1 outputs level 1 differential phase $\emptyset_1(1)=\pi/4$. In an aspect, this may be viewed as rotating PSK constellation subset 0 by phase π/4 such that incremental transition from s(0) (phase of previous symbol $s_0$) to s(1) has taken place. Within PSK constellation subset 1, it is seen that incremental phase difference between s(3) (phase of current symbol $s_1$) and s(1) is π/2, hence, the level 2 encoder 610-2 outputs the level 2 encoded data portion indicating the difference, and the level 2 phase selector 620-2 outputs level 2 differential phase $\emptyset_1(2)=\pi/2$. The phase accumulator 630 determines the total differential phase $\emptyset_1=\pi/4+\pi/2=3\pi/4$. The component code R(1) may protect the level 1 encoded data portion defining the level 1 differential phase $\emptyset_1(1)$. The level 2 encoded data portion defining the smallest set level differential phase $\emptyset_1(2)$ may be uncoded or may be protected with the component code R(2) when coded.

When determining $\emptyset_2=\emptyset_2(1)+\emptyset_2(2)$, $s_2$ and $s_1$ respectively are current and previous symbols. Applying similar logic, since $s_2$ and $s_1$ are both members of same subset (are both members of subset 1), the level 1 encoder 610-1 outputs the level 1 encoded data portion to indicate that there is no change in the partitioning level 1 subset, which is conveyed through the level 1 differential phase $\varnothing_2(1)=0$ from the level 1 phase selector 620-1. Also, the smallest set level encoder 610-2 determines that the smallest set level differential phase $\varnothing_2(2)=\pi/2$ and conveyed by the level 2 phase selector 620-2. Thus, the phase accumulator 630 determines that the total differential phase $\varnothing_2=0+\pi/2=\pi/2$. The component code R(1) may protect the level 1 encoded data portion defining the level 1 differential phase $\varnothing_2(1)$. The level 2 encoded data portion defining the level 2 differential phase $\varnothing_2(2)$ may be actually uncoded or may be protected with the component code R(N) when encoded.

Figure 10B:
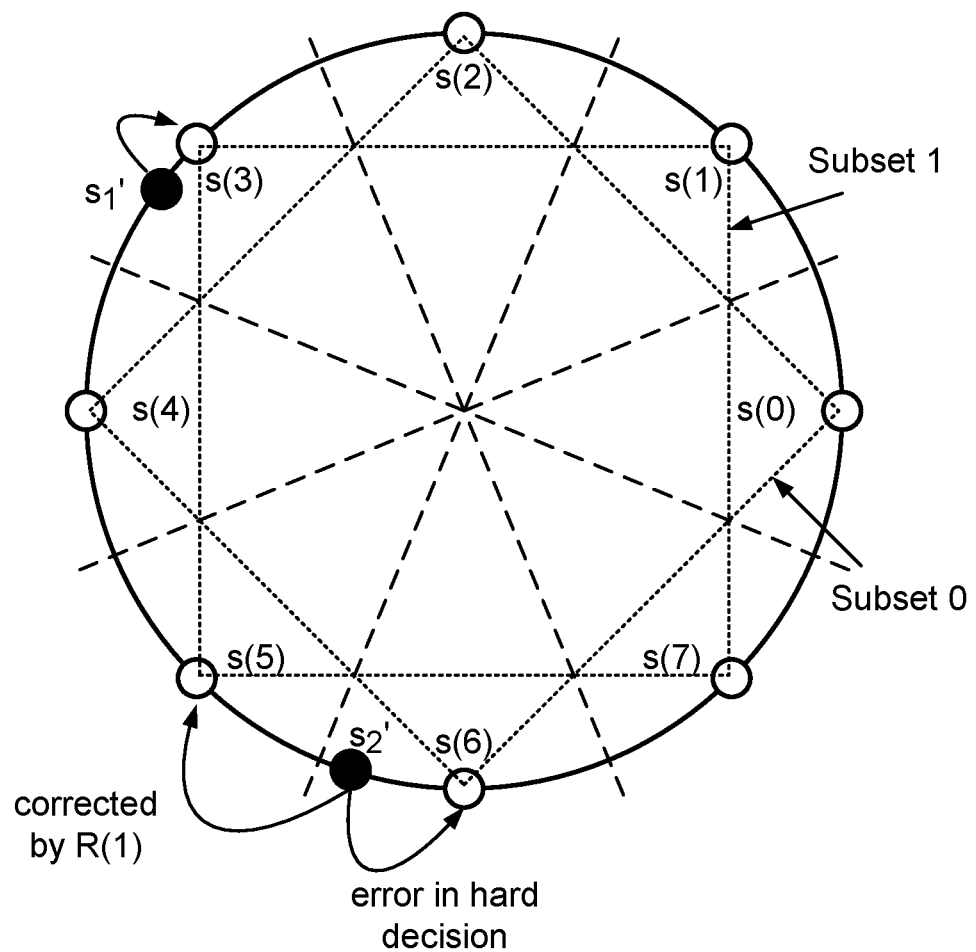
FIG. 10B illustrates a specific example of receiving a current symbol and determining a total differential phase relative to a previous symbol, according to one or more aspects.

FIG. 10B illustrates the receive side (e.g., destination apparatus) operation in which symbols $s_1'$ and $s_2'$ are received from the transmit side (e.g., source apparatus) over a channel. Symbols $s_1'$ and $s_2'$ may be assumed to represent the actual symbols received by the destination apparatus when the source apparatus transmits symbols $s_1$ and $s_2$ as shown in FIG. 10A. Due to noise in the channel, the received symbols $s_1'$ and $s_2'$ are unlikely to coincide with the transmitted symbols $s_1=s(3)$ and $s_2=s(5)$.

Regarding received symbol $s_1'$, note that $s_1'$ is closest to $s(3)$ among the original 8PSK constellation points, which is correct for symbol $s_1$ when the total differential phase $\varnothing_1=3\pi/4$ is applied to symbol $s_0=s(0)$. Thus, it will be assumed that the destination apparatus correctly resolves $s_1'$ as $s_1=s(3)$ (contained in PSK constellation subset 1), and correct demodulating and decoding of the symbol in its entirety takes place.

But regarding the received symbol $s_2'$, situation is quite different. Here, $s_2'$ should resolve to $s(5)$ when the correct total differential phase $\varnothing_2=\pi/2$ is applied to $s_1=s(3)$. However, $s_2'$ is actually closer to $s(6)$ (e.g., due to channel noise) than to $s(5)$. Thus, there can be a confusion regarding whether to resolve $s_2'$ to $s(5)$ or to $s(6)$. Recall that the total differential phase $\varnothing_2=\varnothing_2(1)+\varnothing_2(2)$ and that the level 1 differential phase $\varnothing_2(1)$ conveys information regarding subset rotation/change at partitioning level 1, which is the smallest rotation portion. Thus, the level 1 differential phase $\varnothing_2(1)$ is the rotation portion that is most likely to be obtained with error. This is true for the level 1 different phases $\varnothing_k(1)$ in general.

In the example of FIG. 10B, since $s_2'$ is closest to $s(6)$ which is a member of PSK constellation subset 0, the nearest subset detector 910-1 initially detects that the symbol $s_2'$ falls on PSK constellation subset 0, which is incorrect. That is, the nearest subset detector 910-1 incorrectly detects the PSK constellation subset 0 as the first PSK constellation subset. Since this is a change in the subset from previous symbol $s_1=s(3)$, the nearest subset differential phase detector 920-1 determines the first differential phase $\varnothing_2'(1)=\pi/4$. Next, the demapper 930-1 extracts the level 1 encoded data portion based on the first differential phase $\varnothing_2'(1)$.

The decoder 940-1 decodes the level 1 encoded data portion and outputs the level 1 decoded data portion. Recall that the bits of the level 1 encoded data portion are protected with very strong component code R(1). When the associated component code R(1) is sufficiently strong, e.g., enough to compensate for the very small d-min(1) at the original 8PSK constellation, then the decoder 940-1 can be expected to decode the level 1 encoded data portion to output correct level 1 decoded data portion. That is, the level 1 decoded data portion can be expected to be the same as the level uncoded data portion (at the source apparatus).

The level 1 decoded data portion then is used to correctly select the level 1 PSK constellation subset and to determine the level 1 differential phase $\varnothing_2(1)$. For example, the re-encoder 945-1 re-encodes the level 1 decoded data portion into corresponding level 1 re-encoded data portion using the associated component code R(1). In one aspect, the remapper/remodulator 950-1 then determines that the level 1 differential phase $\varnothing_2(1)=0$ from the level 1 re-encoded data portion. In other words, the re-encoded data portion indicates that there is no change in the level 1 PSK constellation subset in the current symbol $s_2$ from the previous symbol $s_1$. This means PSK constellation subset 1 is selected as the level 1 PSK constellation subset of the current symbol $s_2$. The level 1 differential phase $\varnothing_2(1)$ is passed to the smallest set level. The PSK constellation subset 1 is passed to the child modulation level, which in this instance, is also the smallest set level.

Recall that the selected level 1 PSK constellation subset can be same or different from the first PSK constellation subset. When they are different, the selected level 1 PSK constellation subset is more likely to be correct since this is the subset selected as a result of utilizing the protection of the associated component code R(1).

At the next modulation level, which is the smallest set level, the symbol detector 910-2 detects the nearest symbol from the level 2 PSK constellation set (smallest PSK constellation set). Since PSK constellation subset 1 is selected at partitioning level 1, the detection is constrained to constellation points within the selected PSK constellation subset 1 (i.e., PSK constellation subset 0 is removed from consideration). Thus, the decision becomes selecting between $s(5)$ and $s(7)$. Since d-min is higher at the smallest set level, it is less probable that an erroneous decision will be made. In this instance, symbol detector 910-2 resolves the received signal $s_2'$ to $s(5)$ since $s(5)$ is closer than $s(7)$.

Once the received symbol $s_2'$ is resolved to $s(5)$, the total differential phase detector 915-N determines the total differential phase $\varnothing_2$ from the previous symbol $s_1$. That is, the total differential phase detector 915-N determines the total differential phase $\varnothing_2=\pi/2$. From this, the symbol differential phase detector 925-2 determines the level 2 differential phase $\varnothing_2(2)=\varnothing_2-\varnothing_2(1)=\pi/2$. The demapper 930-2 extracts the level 2 data portion from the calculated level 2 differential phase $\varnothing_2(2)$. If the bits of the level 2 data portion are coded (e.g., if the level 2 data portion is the level 2 encoded data portion), the decoder 940-N decodes the level 2 encoded data portion and outputs the level 2 decoded data portion. Otherwise, the level 2 data portion can be provided as the level 2 decoded data portion without being decoded.

Figure 11:
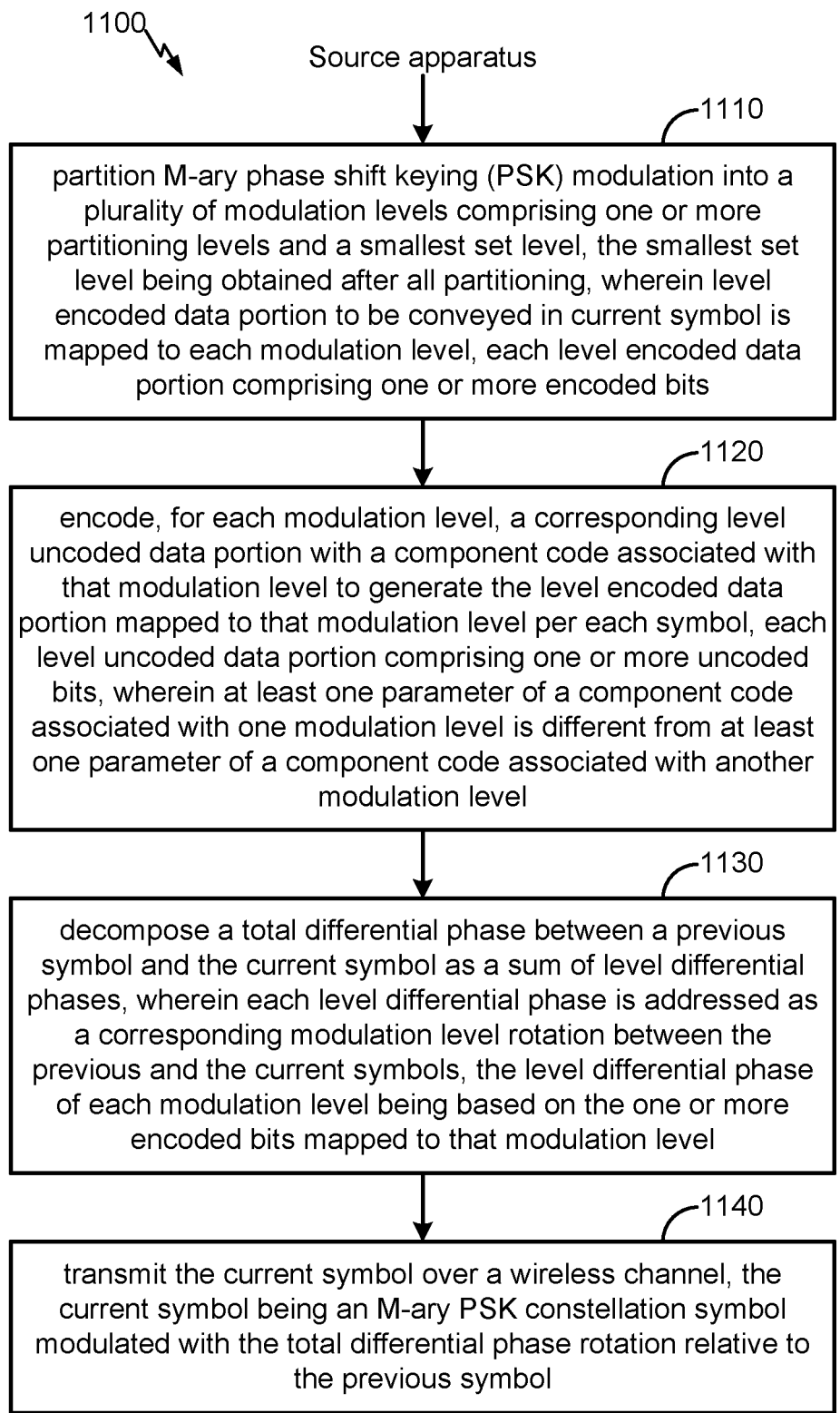
FIG. 11 illustrates a flow chart of an example of a non-coherent communication method performed by a source apparatus, according to one or more aspects.

FIG. 11 illustrates an example method 1100 of a source apparatus configured to perform MLCM non-coherent transmission. The source apparatus may be a network node (e.g., gNB, gNodeB, eNB, eNodeB, etc.), a user equipment (UE), mobile station, or any other type of wireless devices. At block 1110, the source apparatus (e.g., encoder/differential modulator 510, 520) may partition an M-ary phase shift keying (PSK) modulation or constellation into a plurality of modulation levels 1 . . . N. The plurality of modulation levels may comprise one or more partitioning levels 1 . . . N−1 and smallest set level, i.e., modulation level N. The smallest set level may be obtained after all partitioning steps. A level encoded data portion to be conveyed in a current symbol may be mapped to each modulation level. As indicated, each level encoded data portion may comprise level n encoded bits, which are one or more encoded bits representing a portion of the encoded bits of the encoded block.

Each partitioning level n, n=1 . . . N−1 may comprise a level n PSK constellation set that can be subdivided into a plurality of level n PSK constellation subsets. The level N PSK constellation set (i.e., the smallest PSK constellation set) may be a PSK constellation that is not further subdivided into PSK constellation subsets. Each modulation level n other than the smallest set level may be a parent level of modulation level n+1. Each modulation level n other than the partitioning level 1 may be a child level of modulation level n−1. For each partitioning level n, n=1 . . . N−1, a number of PSK symbols in the level n PSK constellation set may be greater than a number of PSK symbols in the level n+1 PSK constellation set of the child level.

At block 1120, the source apparatus (e.g., level n encoders 610-$n$) may encode, for each modulation level n, the level n uncoded data portion using a component code R(n) associated with that modulation level n to generate the corresponding level n encoded data portion. Recall that each level n uncoded data portion may comprise one or more uncoded bits (level n uncoded bits) representing a portion of uncoded bits of the uncoded block. Similarly, each level n encoded data portion may comprise one or more encoded bits (level n encoded bits) representing a portion of encoded bits of the encoded block.

The component codes may be such that at least one parameter of a component code (e.g., code rate) associated with one modulation level may be different from at least one parameter of a component code associated with another modulation level. As an example, for each partitioning level n, n=N−1, a code rate of the component code R(n) may be lower than a code rate of the component code R(n+1) of the child level. In some aspects, there may be no component code R(N) associated with the smallest set level such that the level N uncoded data portion remain uncoded, i.e., the level N uncoded bits may be modulated on the current symbol $s_k$.

At block 1130, the source apparatus (e.g., level n phase selectors 620-$n$, phase cumulator 630) may decompose a total differential phase $Ø_k$ between a previous symbol $s_{k-1}$ and the current symbol $s_k$ as a sum of level n differential phases $Ø_k(n)$, n=1 . . . N. Each level n differential phase $Ø_k(n)$ may be addressed as a corresponding modulation level rotation between the previous and the current symbols $s_{k-1}$, $s_k$. The level n differential phase $Ø_k(n)$ of each modulation level n may be based on the level n encoded data portion mapped to the modulation level n.

At block 1140, the source apparatus (e.g., differential phase rotator 640, transmitter 530) may transmit the current $s_k = s_{k-1} e^{Ø_k}$ over a wireless channel. The current symbol $s_k$ may be an M-ary PSK constellation symbol modulated with the total differential phase $Ø_k$ rotation relative to the previous symbol $s_{k-1}$.

M may be any number. However, it may be preferred that M=$2^m$ in which m is a positive integer representing a total number of coded bits of data transmitted in the current symbol $s_k$. Also, the portion of data mapped to each modulation level may comprise a portion of the coded bits such that all m bits are conveyed in the current symbol $s_k$. That is, the sum of level n encoded data portions may convey the m bits.

For each partitioning level n, n=1 . . . N−1, the level n PSK constellation set of the partitioning level n may be divided into a Pn number of the level n PSK constellation subsets such that a number of level n encoded bits per symbol is log$_2$ Pn. Recall that the level n encoded bits are the one or more encoded bits of the level n encoded data portion mapped to the partitioning level n. For each partitioning level n, the level n encoded bits may be used to select one of the level n PSK constellation subsets of the partitioning level n. The selected level n PSK constellation subset may have the current symbol $s_k$ as one of its member symbols, At each partitioning level n, n=1 . . . N−1, the level n differential phase $Ø_k(n)$ may convey a phase rotation associated with the selected level n PSK constellation subset and a level n PSK constellation subset of the previous symbol. Also, at each partitioning level n other than the partitioning level 1, the level n PSK constellation set of the partitioning level n may be constrained to the level n−1 constellation subset selected at the parent partitioning level n−1. That is, the level n PSK constellation set may be one of the plurality of level n−1 PSK constellation subset selected at the parent level. For the partitioning level 1, the original M-ary constellation may be the level 1 PSK constellation set. Note that in one or more aspects, the level n PSK constellation subset for each partitioning level n may be selected sequentially starting from the partitioning level 1.

At the smallest set level, Q may represent a modulation order of the smallest PSK constellation set (level N PSK constellation set) such that a number of level N encoded bits per symbol is log$_2$ Q, The level N encoded bits may be the one or more encoded bits of the level N encoded data portion mapped to the smallest set level. As indicated above, the level N encoded data portion may or may not actually be encoded. The smallest PSK constellation set may be one of a plurality of level N−1 constellation subsets selected at the partitioning level N−1.

Figure 12:
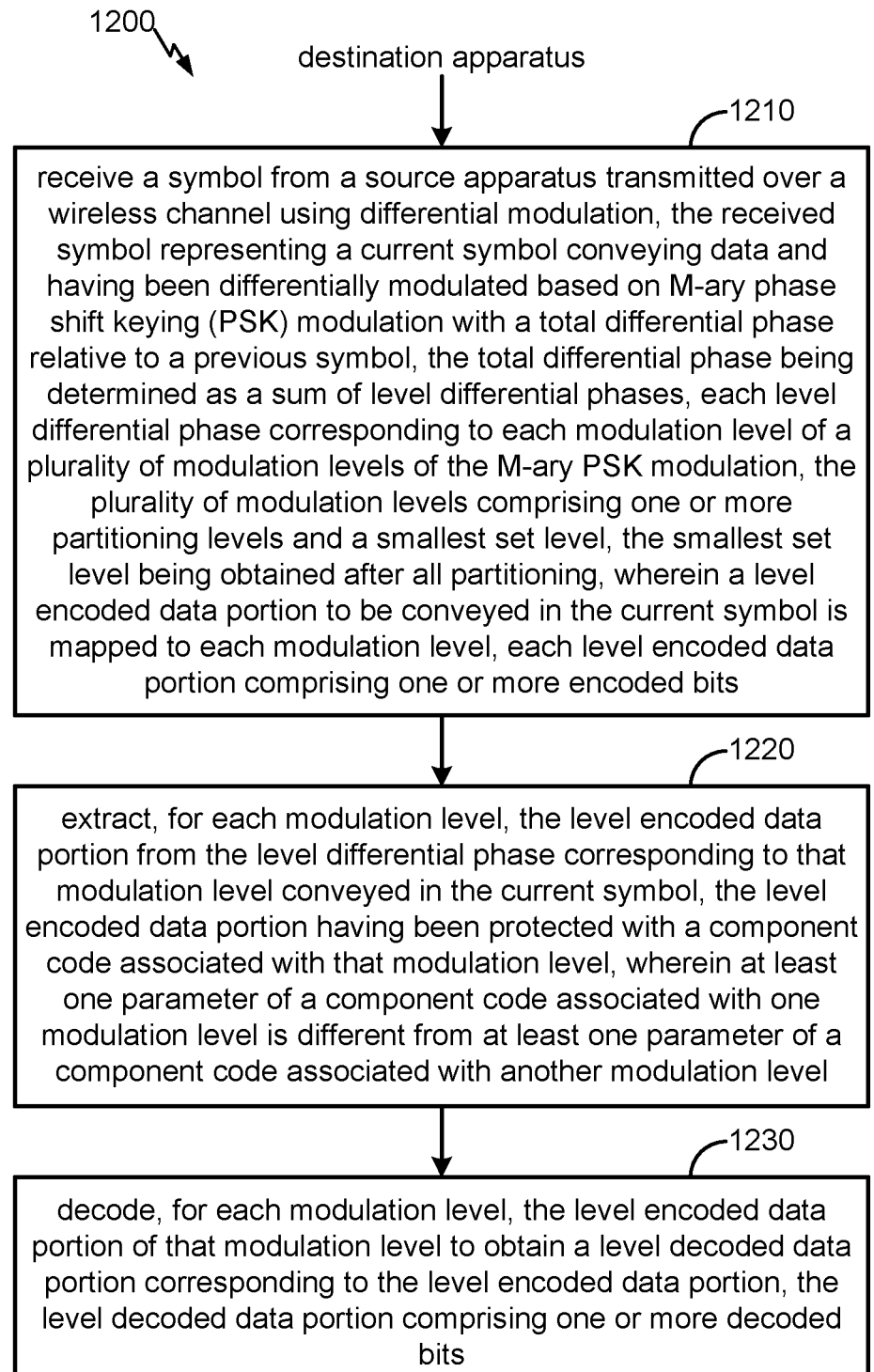
FIGS. 12-16 illustrate a flow chart of an example of a non-coherent communication method performed by a destination apparatus, according to one or more aspects.

FIG. 12 illustrates an example method 1200 of a destination apparatus configured to perform MLCM non-coherent reception. The destination apparatus may be a network node (e.g., gNB, gNodeB, eNB, eNodeB, etc.), a user equipment (UE), mobile station, or any other type of wireless devices. At block 1210, the destination apparatus (e.g., receiver 710) may receive a symbol $s_k'$ from the source apparatus transmitted over a wireless channel using differential modulation. The received symbol $s_k'$ may represent a current symbol $s_k$ conveying data and which may have been differentially modulated based on M-ary phase shift keying (PSK) modulation with a total differential phase $Ø_k$ relative to a previous symbol $s_{k-1}$. The total differential phase $Ø_k$ may be determined as a sum of level n differential phases $Ø_k(n)$, n=1 . . . N. Each level n differential phase $Ø_k(n)$ may correspond to each modulation level n of a plurality of modulation levels 1 . . . N of the M-ary PSK modulation. The plurality of modulation levels may comprise one or more partitioning levels 1 . . . N−1 and smallest set level, i.e., modulation level N. The smallest set level may be obtained after all partitioning steps. A level encoded data portion to be conveyed in the current symbol may be mapped to each modulation level. Each level encoded data portion may comprise level n encoded bits, which are one or more encoded bits representing a portion of the encoded bits of the encoded block.

At block 1220, the destination apparatus (e.g., demodulator/decoder 720, 730) may extract, for each modulation level n, the level n encoded data portion corresponding to the modulation level n conveyed in the current symbol $s_k$. The level n encoded data portion may have been protected with a component code associated with the modulation level n. The component codes may be such that at least one parameter of a component code (e.g., code rate) associated with one modulation level may be different from at least one parameter of a component code associated with another modulation level.

At block 1230, the destination apparatus (e.g., demodulator/decoder 720, 730) may decode, for each modulation level n, the level n encoded data portion of the modulation level n to obtain level n decoded data portion corresponding to the level n encoded data portion.

Figure 13:
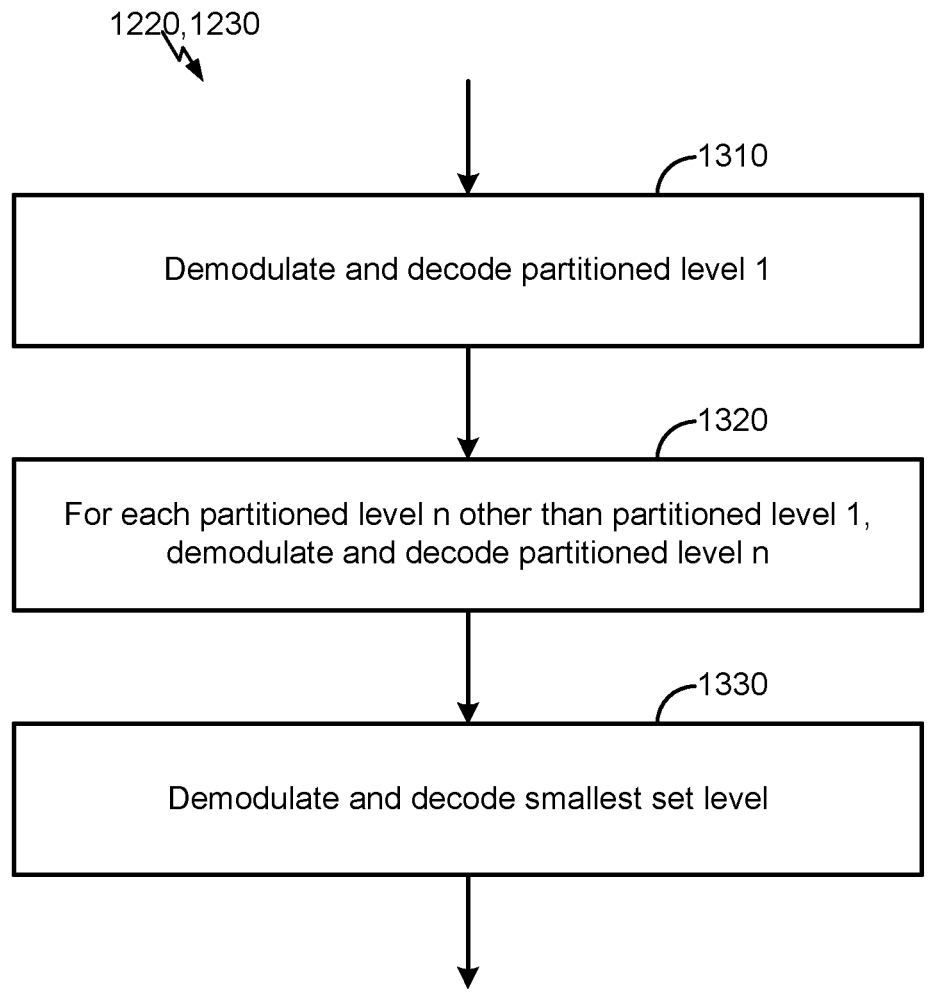

FIG. 13 illustrates an example process to implement blocks 1220 and 1230. At block 1310, the destination apparatus (e.g., demodulator/decoder 720, 730) may demodulate and decode partitioning level 1. At block 1320, for each partitioning level n other than the partitioning level 1, i.e., for partitioning levels n, n=2 . . . N−1, the destination apparatus (e.g., demodulator/decoder 720, 730) may demodulate and decode partitioning level n. Note that when N=2, this means that block 1320 may not be performed, i.e., block 1320 may be optional. At block 1330, destination apparatus (e.g., demodulator/decoder 720, 730) may demodulate and decode the smallest set level.

Figure 14:
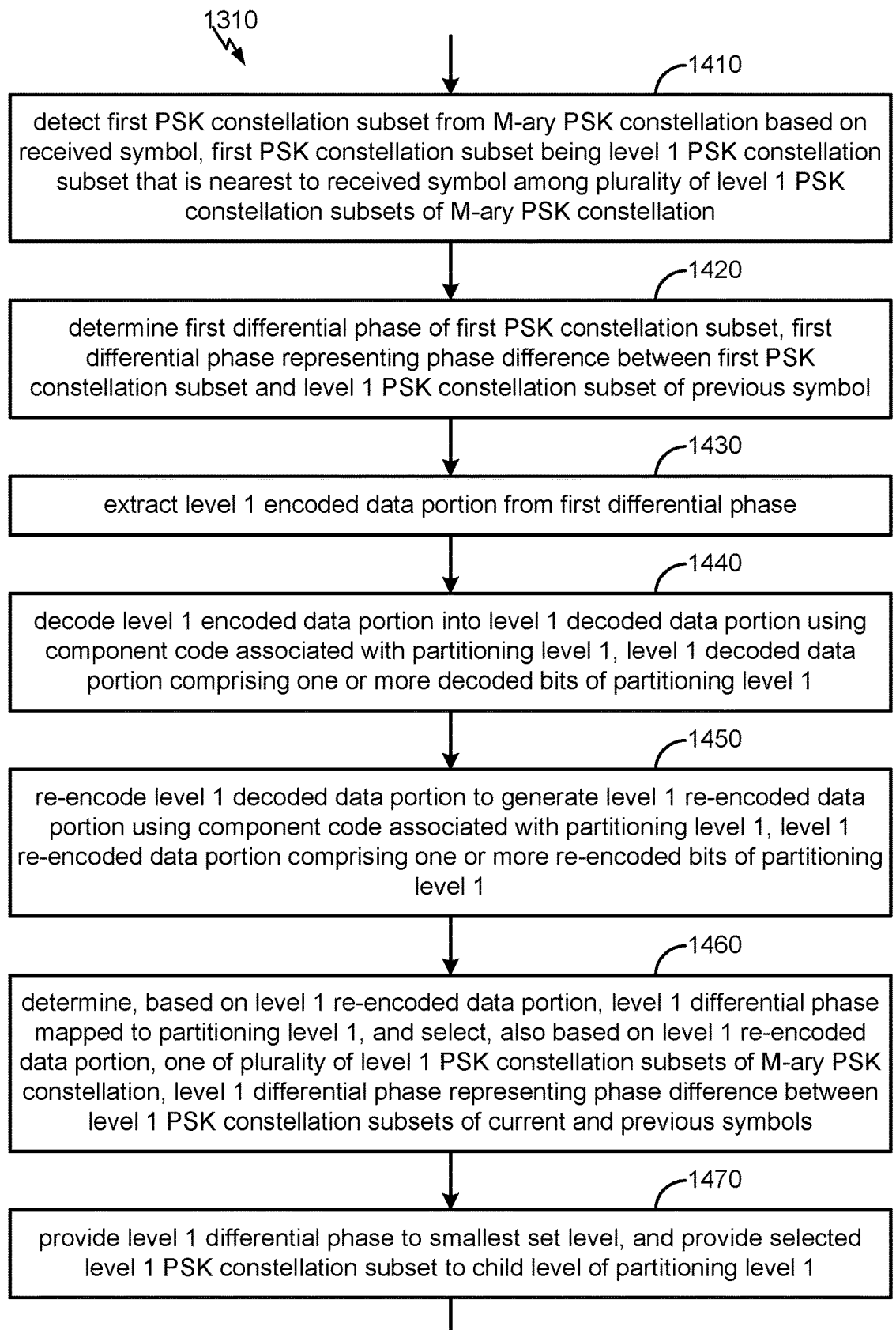

FIG. 14 illustrates an example process to implement block 1310. At block 1410, the destination apparatus (e.g., nearest subset detector 910-1) may detect a first PSK constellation subset from the M-ary PSK constellation based on the received symbol $s_k'$. The first PSK constellation subset may be the level 1 PSK constellation subset that is nearest to the received symbol $s_k'$ among the plurality of level 1 PSK constellation subsets of the M-ary PSK constellation.

At block 1420, the destination apparatus (e.g., nearest subset differential phase detector 920-1) may determine a first differential phase $Ø_k'(1)$ of the first PSK constellation subset. The first differential phase $Ø_k'(1)$ may represent a phase difference between the first PSK constellation subset and a level 1 PSK constellation subset of the previous symbol $s_{k-1}$.

At block 1430, the destination apparatus (e.g., demapper 930-1) may extract the level 1 encoded data portion from the first differential phase $Ø_k'(1)$. At block 1440, the destination apparatus (e.g., decoder 940-1) may decode the level 1 encoded data portion into corresponding level 1 decoded data portion using the component code R(1) associated with the partitioning level 1. The level 1 decoded bits of the level 1 decoded data portion may be part of the decoded bit vector output by the differential demodulator 720 and the decoder 730.

At block 1450, the destination apparatus (e.g., re-encoder 945-1) may re-encode the level 1 decoded data portion to generate level 1 re-encoded data portion using the component code R(1) associated with the partitioning level 1.

At block 1460, the destination apparatus (e.g., remapper/remodulator 950-1) may determine the level 1 differential phase $Ø_k(1)$ mapped to the partitioning level 1 based on the level 1 re-encoded data portion. Also at block 1460, the destination apparatus (e.g., remapper/remodulator 950-1) may select one of the level 1 PSK constellation subsets from the M-ary PSK constellation also based on the level 1 re-encoded data portion. The level 1 differential phase $Ø_k(1)$ may represent a phase difference between the selected level 1 PSK constellation subset of the current symbol $s_k$ and the level 1 PSK constellation subset of the previous symbol $s_{k-1}$.

At block 1470, the destination apparatus (e.g., remapper/remodulator 950-1) may provide the level 1 differential phase $Ø_k(1)$ to the smallest set level. Also at block 1470, the destination apparatus (e.g., remapper/remodulator 950-1) may provide the selected level 1 PSK constellation subset to the child level of the partitioning level 1, i.e., to the modulation level 2 (which may be another partitioning level or the smallest set level).

Figure 15:
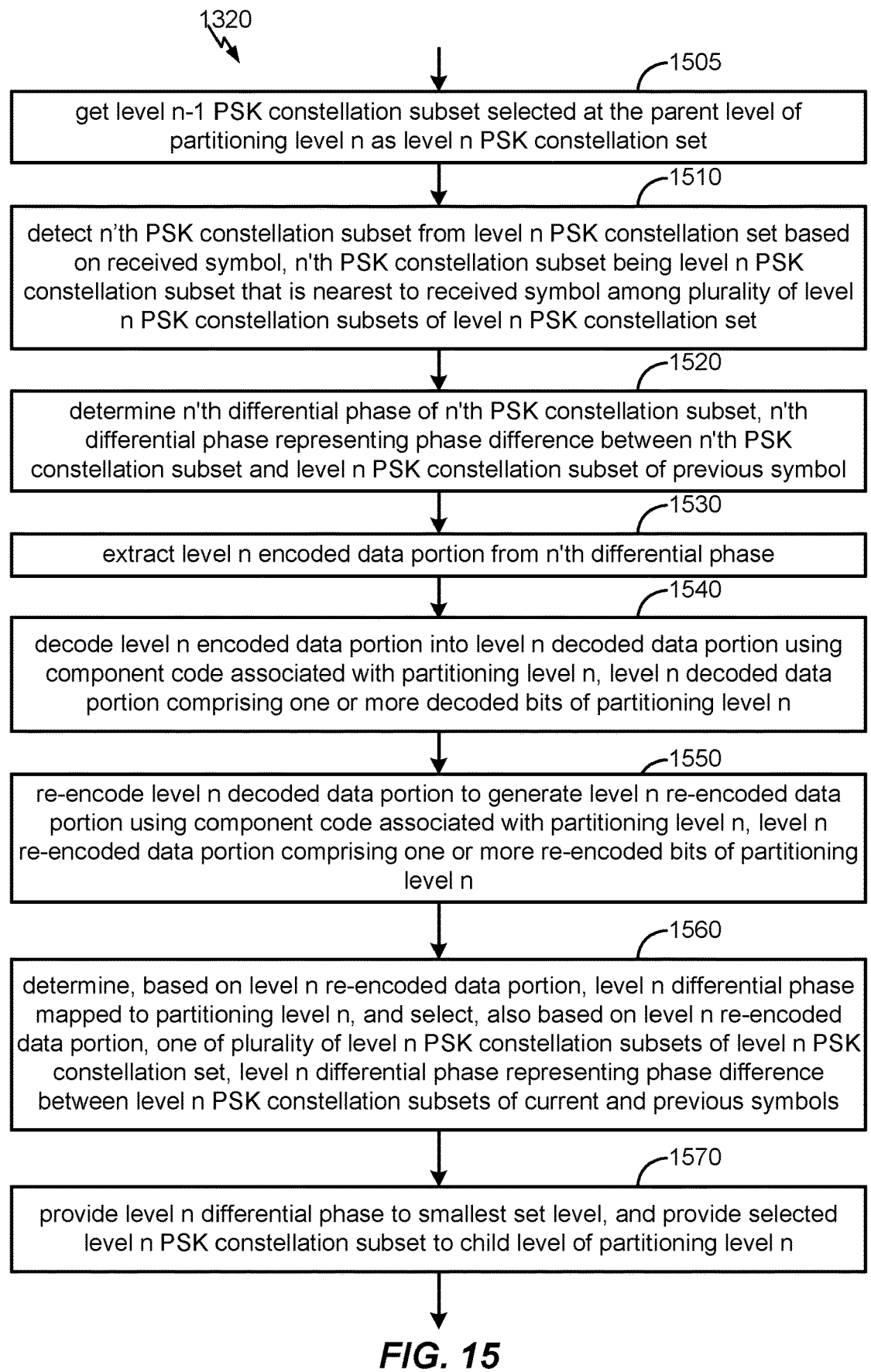

FIG. 15 illustrates an example process to implement block 1320. At block 1505, the destination apparatus (e.g., nearest subset detector 910-n) get a level n−1 PSK constellation subset selected at the parent level of the partitioning level n as the level n PSK constellation set of the partitioning level n. At block 1510, the destination apparatus (e.g., nearest subset detector 910-n) may detect an n'th PSK constellation subset from the level n PSK constellation set based on the received symbol $s_k'$. The n'th PSK constellation subset may be the level n PSK constellation subset that is nearest to the received symbol $s_k'$ among the plurality of level n PSK constellation subsets of the level n PSK constellation set.

At block 1520, the destination apparatus (e.g., nearest subset differential phase detector 920-n) may determine an n'th differential phase $Ø_k'(n)$ of the n'th PSK constellation subset. The n'th differential phase $Ø_k'(n)$ may represent a phase difference between the n'th PSK constellation subset and a level n PSK constellation subset of the previous symbol $s_{k-1}$.

At block 1530, the destination apparatus (e.g., demapper 930-n) may extract the level n encoded data portion from the n'th differential phase $Ø_k'(n)$. At block 1540, the destination apparatus (e.g., decoder 940-n) may decode the level n encoded data portion into corresponding level n decoded data portion using the component code R(n) associated with the partitioning level n. The level n decoded bits of the level n decoded data portion may be part of the decoded bit vector output by the differential demodulator 720 and the decoder 730.

At block 1550, the destination apparatus (e.g., re-encoder 945-n) may re-encode the level n decoded data portion to generate level n re-encoded data portion using the component code R(n) associated with the partitioning level n.

At block 1560, the destination apparatus (e.g., remapper/remodulator 950-n) may determine the level n differential phase $Ø_k(n)$ mapped to the partitioning level n based on the level n re-encoded data portion. Also at block 1560, the destination apparatus (e.g., remapper/remodulator 950-n) may select one of the level n PSK constellation subsets from the level n PSK constellation set also based on the level n re-encoded data portion. The level n differential phase $Ø_k(n)$ may represent a phase difference between the selected level n PSK constellation subset of the current symbol $s_k$ and the level n PSK constellation subset of the previous symbol $s_{k-1}$.

At block 1570, the destination apparatus (e.g., remapper/remodulator 950-n) may provide the level n differential phase $Ø_k(n)$ to the smallest set level. Also at block 1570, the destination apparatus (e.g., remapper/remodulator 950-n) may provide the selected level n PSK constellation subset to the child level of the partitioning level n, i.e., to the modulation level n+1 (which may be another partitioning level or the smallest set level). Blocks 1505-1570 may be repeated for each partitioning level n, n=2 . . . N−1.

Figure 16:
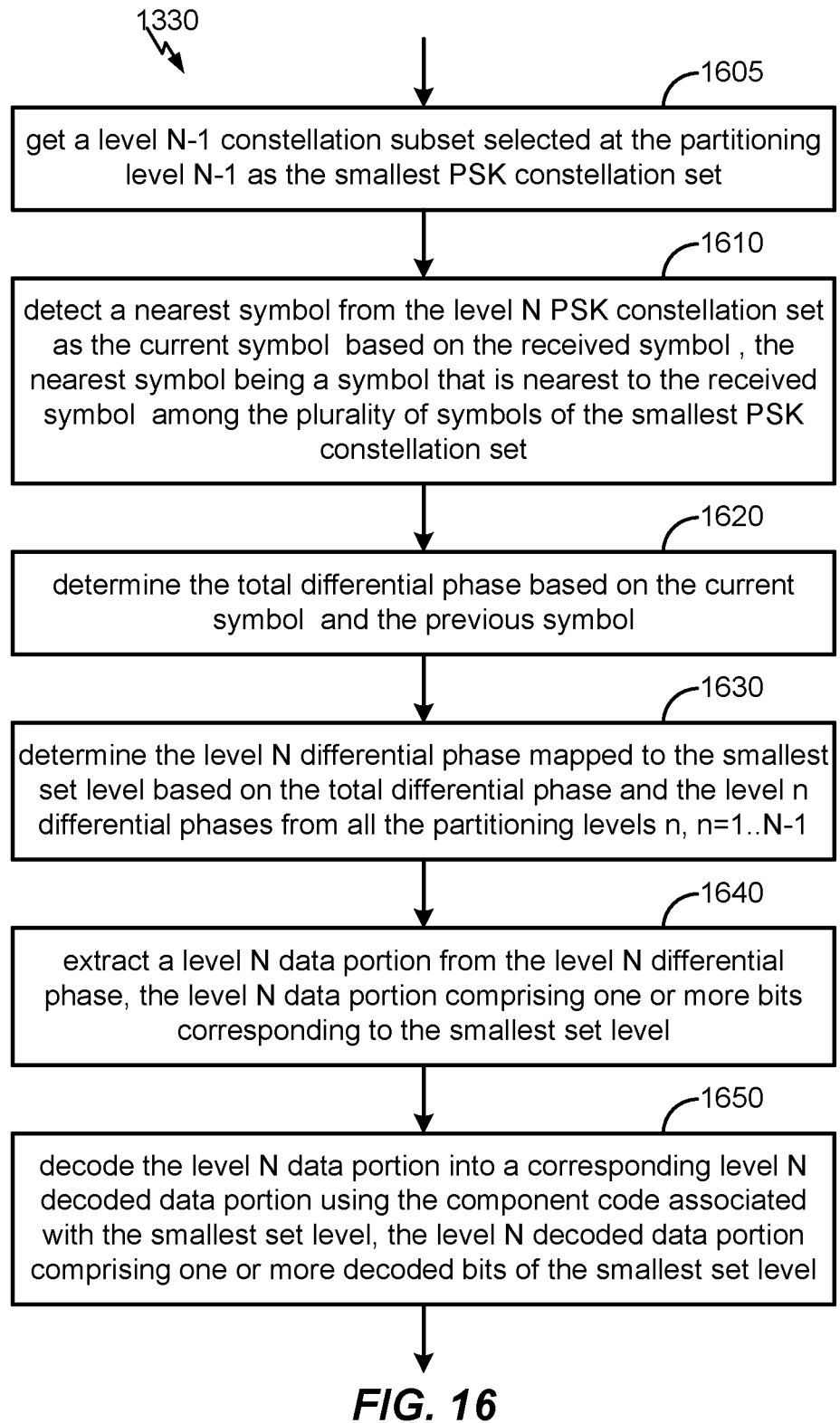

FIG. 16 illustrates an example process to implement block 1330. At block 1605, the destination apparatus (e.g., symbol detector 910-N) may get a level N−1 constellation subset selected at the partitioning level N−1 as the level N constellation set (smallest PSK constellation set). At block 1610, the destination apparatus (e.g., symbol detector 910-N) may detect a nearest symbol from the smallest PSK constellation set as the current symbol $s_k$ based on the received symbol $s_k'$. The nearest symbol may be a symbol that is nearest to the received symbol $s_k'$ among the plurality of symbols of the smallest PSK constellation set. At block 1620, the destination apparatus (e.g., total differential phase detector 915-N) may determine the total differential phase $Ø_k$ based on the current symbol $s_k$ and the previous symbol $s_{k-1}$.

At block 1630, the destination apparatus (e.g., symbol differential phase detector 925-N) may determine the level N differential phase $Ø_k(N)$ based on the total differential phase $Ø_k$ and the level n differential phases $Ø_k(n)$ from the partitioning levels n, n=1 . . . N−1. For example, the symbol differential phase detector 925-N may calculate $Ø_k(N)=Ø_k-$ $\Sigma_{n=1}^{N-1} \emptyset_k(n)$. At block 1640, the destination apparatus (e.g., demapper 930-N) may extract the level N data portion based on the level N differential phase $\emptyset_k(N)$. The level N data portion may comprise one or more bits (coded or uncoded) of the smallest set level. When the bits of the level N data portion are coded (i.e., the level N data portion is the level N encoded data portion), then at block 1650, the destination apparatus (e.g., decoder 940-N) may decode the level N data portion into corresponding level N decoded data portion based on the component code R(N) associated with the smallest set level. When bits of the level N data portion are not coded, then the destination apparatus may output the level N data portion after they are extracted at block 1640. The level N decoded bits of the level n decoded data portion may be part of the decoded bit vector output by the differential demodulator 720 and the decoder 730.

The following provides an overview of examples of the present disclosure:

Example 1

A method of a source apparatus, comprising: encoding, for each modulation level of at least part of a plurality of modulation levels, a corresponding level uncoded data portion with a component code associated with that modulation level to generate a level encoded data portion to be conveyed in a current symbol, wherein an M-ary phase shift keying (PSK) modulation being partitioned into the plurality of modulation levels; determining a total differential phase between a previous symbol and the current symbol as a sum of level differential phases of the plurality of modulation levels, the level differential phase of each of the plurality of modulation levels being based on the level encoded data portion mapped to that modulation level; and transmitting the current symbol based on the total differential phase over a wireless channel.

Example 2

The method of example 1, wherein the current symbol is an M-ary PSK constellation symbol modulated with the total differential phase rotation relative to the previous symbol.

Example 3

The method of any one of examples 1 through 2, wherein the plurality of modulation levels comprise one or more partitioning levels and a smallest set level, the smallest set level being obtained after all partitioning, wherein each level encoded data portion comprises one or more encoded bits, wherein each level uncoded data portion comprises one or more uncoded bits, wherein at least one parameter of a component code associated with one modulation level is different from at least one parameter of a component code associated with another modulation level, and wherein each level differential phase is determined as a corresponding modulation level rotation between the previous and the current symbols.

Example 4

The method of example 3, wherein the plurality of modulation levels comprises N modulation levels in which each modulation level n, n=1 . . . N comprises a level n PSK constellation set, each level n PSK constellation set being a PSK constellation, wherein the modulation levels 1 . . . N−1 are the partitioning levels 1 . . . N−1 and the modulation level N is the smallest set level comprising a smallest PSK constellation set obtained after all partitioning, wherein for each partitioning level n, n=1 . . . N−1, the level n PSK constellation set of the partitioning level n is divided into a plurality of level n PSK constellation subsets, each level n PSK constellation subset being a PSK constellation, wherein the plurality of modulation levels comprises at least the partitioning level 1 and the smallest set level, wherein each modulation level n, n=1 . . . N−1 is a parent level of modulation level n+1, and each modulation level n, n=2 . . . N is a child level of modulation level n−1, and wherein for each partitioning level n, n=1 . . . N−1, a number of PSK symbols in the level n PSK constellation set of the partitioning level n is greater than a number of PSK symbols in the level n+1 constellation set of the child level.

Example 5

The method of any one of examples 3 through 4, wherein strengths of the component codes of the partitioning levels are such that for each partitioning level n, a code rate of the component code of the partitioning level n is lower than a code rate of the component code of the child level of the partitioning level n.

Example 6

The method of any one of examples 3 through 5, wherein there is no component code associated with the smallest set level such that a smallest set level uncoded data portion remain uncoded when modulated on the current symbol, the smallest set level uncoded data portion being the level uncoded data portion corresponding to the smallest set level.

Example 7

The method of any one of examples 3 through 6, wherein for each partitioning level n, the level n PSK constellation set of the partitioning level n is divided into a Pn number of the level n PSK constellation subsets such that a number of level n encoded bits per symbol is $\log_2$ Pn, the level n encoded bits being the one or more encoded bits of the level n encoded data portion mapped to the partitioning level n, and wherein for each partitioning level n, the corresponding level n encoded data portion is used to select one of the level n PSK constellation subsets of the partitioning level n, the selected level n PSK constellation subset having the current symbol as one of its member symbols.

Example 8

The method of any one of examples 3 through 7, wherein for each partitioning level n, the level n differential phase $\emptyset_k(n)$ of the partitioning level n conveys a phase rotation associated with the selected level n PSK constellation subset of the partitioning level n and a level n PSK constellation subset of the previous symbol.

Example 9

The method of any one of examples 3 through 8, wherein for each partitioning level n other than the partitioning level 1, the level n PSK constellation set of the partitioning level n is one of the plurality of level n−1 PSK constellation subsets selected at the parent partitioning level n−1.

Example 10

The method of any one of examples 3 through 9, wherein the level n PSK constellation subset for each partitioning level n is selected sequentially starting from the partitioning level 1.

Example 11

The method of any one of examples 3 through 10, wherein at the smallest set level, Q represents a modulation order of a smallest PSK constellation set such that a number of level N encoded bits per symbol is $\log_2 Q$, the level N encoded bits being the one or more encoded bits of the level N encoded data portion mapped to the smallest set level, and the smallest PSK constellation set being one of the plurality of level N−1 PSK constellation subsets selected at the partitioning level N−1.

Example 12

The method of any one of examples 3 through 11, wherein there is no component code associated with the smallest set level such that the level N encoded data portion modulated on the current symbol is the same as the level N uncoded data portion.

Example 13

The method of any one of examples 3 through 12, wherein the level N differential phase $\emptyset_k(N)$ of the smallest set level conveys a phase rotation between the current and previous symbols at the smallest PSK constellation set level.

Example 14

The method of any one of examples 1 through 13, wherein the M-ary phase shift keying (PSK) modulation being partitioned into the plurality of modulation levels in accordance with a transmission modulation coding scheme (MCS), which are associated with parameters MCS={M, N, {Pn}, {R(n)}} or MCS={M, N, {Pn}, Q, {R(n)}} in which M represents a modulation order of the M-ary phase shift keying (PSK) modulation such that $M=2^m$ in which m is a positive integer representing a total number of encoded bits of encoded data transmitted in the current symbol, N represents a number of modulation levels, Pn represents a number of level n PSK constellation subsets for each modulation level n, n=1 ... N−1, Q represents a modulation order of modulation level N, and R(n) represents a component code corresponding to each modulation level n, n=1 ... N.

Example 15

A source apparatus comprising a processor, memory coupled with the processor, the processor and memory configured perform a method of any one of examples 1 through 14.

Example 16

A source apparatus comprising at least one means for performing a method of any one of examples 1 through 14.

Example 17

A non-transitory computer-readable medium storing code for a source apparatus comprising a processor, memory coupled with the processor, and instructions stored in the memory and executable by the processor to cause the network node to perform a method of any one of examples 1 through 14.

Example 18

A method of a destination apparatus comprising: receiving a symbol from a source apparatus transmitted over a wireless channel, the received symbol representing a current symbol conveying data and having been differentially modulated based on M-ary phase shift keying (PSK) modulation with a total differential phase, the total differential phase being determined as a sum of a plurality of level differential phases, each of the plurality of level differential phases corresponding to each modulation level of a plurality of modulation levels of the M-ary PSK modulation, a level encoded data portion conveyed in the current symbol being mapped to each of at least part of the plurality of modulation levels; determining the plurality of level differential phases corresponding to the plurality of modulation levels based on the received symbol; extracting, for each modulation level, data portion from the level differential phase corresponding to that modulation level, the extracted data portion of each of the at least part of the plurality of modulation levels being level encoded data portion having been protected with a component code associated with that modulation level; and decoding, for each of the at least part of the plurality of modulation levels, the level encoded data portion of that modulation level to obtain a corresponding level decoded data portion.

Example 19

The method of example 18, wherein the current symbol is an M-ary PSK constellation symbol modulated with the total differential phase rotation relative to a previous symbol.

Example 20

The method of any one of examples 18 through 19, wherein the plurality of modulation levels comprise one or more partitioning levels and a smallest set level, the smallest set level being obtained after all partitioning, wherein each level encoded data portion comprises one or more encoded bits, wherein each level decoded data portion comprises one or more decoded bits, wherein at least one parameter of a component code associated with one modulation level is different from at least one parameter of a component code associated with another modulation level, and wherein each level differential phase is determined as a corresponding modulation level rotation between a previous symbol and the current symbol.

Example 21

The method of example 20, wherein the plurality of modulation levels comprises N modulation levels in which each modulation level n, n=1 ... N comprises a level n PSK constellation set, each level n PSK constellation set being a PSK constellation, wherein the modulation levels 1 ... N−1 are the partitioning levels 1 ... N−1 and the modulation level N is the smallest set level comprising a smallest PSK constellation set obtained after all partitioning, wherein for each partitioning level n, n=1 ... N−1, the level n PSK constellation set of the partitioning level n is divided into a plurality of level n PSK constellation subsets, each level n PSK constellation subset being a PSK constellation, wherein the plurality of modulation levels comprises at least the partitioning level 1 and the smallest set level, wherein each modulation level n, n=1 . . . N−1 is a parent level of modulation level n+1, and each modulation level n, n=2 . . . N is a child level of modulation level n−1, and wherein for each partitioning level n, n=1 . . . N−1, a number of PSK symbols in the level n PSK constellation set of the partitioning level n is greater than a number of PSK symbols in the level n+1 constellation set of the child level.

Example 22

The method of any one of examples 20 through 21, wherein strengths of the component codes of the partitioning levels are such that for each partitioning level n, a code rate of the component code of the partitioning level n is lower than a code rate of the component code of the child level of the partitioning level n.

Example 23

The method of any one of examples 20 through 22, wherein there is no component code associated with the smallest set level such that a smallest set level uncoded data portion remain uncoded when modulated on the current symbol, the smallest set level uncoded data portion being the level uncoded data portion corresponding to the smallest set level.

Example 24

The method of any one of examples 20 through 23, wherein the level encoded data portion mapped to each modulation level are extracted and decoded sequentially starting from the partitioning level 1.

Example 25

The method of any one of examples 20 through 24, wherein the method further comprises: re-encoding, for each partitioning level n, the level n decoded data portion of the partitioning level n to generate a corresponding level n re-encoded data portion comprising one or more re-encoded bits; and selecting, for each partitioning level n, one of the level n PSK constellation subsets of the partitioning level n based on the one or more re-encoded bits of the corresponding level n re-encoded data portion, the selected level n PSK constellation subset being used to extract and decode the level n+1 encoded data portion of the child level of the partitioning level n.

Example 26

The method of any one of examples 20 through 25, wherein for each partitioning level n, the level n PSK constellation set of the partitioning level n is divided into a Pn number of the level n PSK constellation subsets such that a number of level n encoded bits per symbol is $\log_2 P_n$, the level n encoded bits being the one or more encoded bits of the level n encoded data portion mapped to the partitioning level n, wherein at the smallest set level, Q represents a modulation order of a smallest PSK constellation set such that a number of level N encoded bits per symbol is $\log_2 Q$, the level N encoded bits being the one or more encoded bits of the level N encoded data portion mapped to the smallest set level, and wherein extracting and decoding for each modulation level comprises: for each partitioning level, demodulating and decoding the level n encoded data portion mapped to the partitioning level to obtain the corresponding level n decoded data portion; and demodulating and decoding the level N encoded data portion mapped to the smallest set level to obtain the corresponding level N decoded data portion subsequent to demodulating and decoding all of the partitioning levels.

Example 27

The method of example 26, wherein demodulating and decoding the partitioning level 1 comprises: detecting a first PSK constellation subset from the M-ary PSK constellation based on the received symbol $s_k'$, the first PSK constellation subset being the level 1 PSK constellation subset that is nearest to the received symbol $s_k'$ among the plurality of level 1 PSK constellation subsets of the M-ary PSK constellation; determining a first differential phase $\varnothing_k'(1)$ of the first PSK constellation subset, the first differential phase $\varnothing_k'(1)$ representing a phase difference between the first PSK constellation subset and a level 1 PSK constellation subset of the previous symbol $s_{k-1}$; extracting the level 1 encoded data portion from the first differential phase $\varnothing_k'(1)$; decoding the level 1 encoded data portion into a corresponding level 1 decoded data portion using the component code associated with the partitioning level 1, the level 1 decoded data portion comprising one or more decoded bits of the partitioning level 1; re-encoding the level 1 decoded data portion to generate a level 1 re-encoded data portion using the component code associated with the partitioning level 1, the level 1 re-encoded data portion comprising one or more re-encoded bits of the partitioning level 1; determining, based on the level 1 re-encoded data portion, the level 1 differential phase $\varnothing_k(1)$ mapped to the partitioning level 1 and select, also based on the level 1 re-encoded data portion, one of the plurality of level 1 PSK constellation subsets of the M-ary PSK constellation, the level 1 differential phase $\varnothing_k(1)$ representing a phase difference between the level 1 PSK constellation subsets of the current symbol $s_k$ and the previous symbol $s_{k-1}$; and providing the level 1 differential phase $\varnothing_k(1)$ to the smallest set level, and provide the selected level 1 PSK constellation subset to the child level of the partitioning level 1.

Example 28

The method of any one of examples 26 through 27, wherein demodulating and decoding the partitioning level n, n=2 . . . N−1, comprises: getting a level n−1 PSK constellation subset selected at the parent level of the partitioning level n as the level n PSK constellation set; detecting an n'th PSK constellation subset from the level n PSK constellation set based on the received symbol $s_k'$, the n'th PSK constellation subset being the level n PSK constellation subset that is nearest to the received symbol $s_k'$ among the plurality of level n PSK constellation subsets of the level n PSK constellation set; determining an n'th differential phase $\varnothing_k'(n)$ of the n'th PSK constellation subset, the n'th differential phase $\varnothing_k'(n)$ representing a phase difference between the n'th PSK constellation subset and a level n PSK constellation subset of the previous symbol $s_{k-1}$; extracting the level n encoded data portion from the n'th differential phase $\varnothing_k'(n)$; decoding the level n encoded data portion into a corresponding level n decoded data portion using the component code associated with the partitioning level n, the level n decoded data portion comprising one or more decoded bits of the partitioning level n; re-encoding the level n decoded data portion to generate a level n re-encoded data portion using the component code associated with the partitioning level n, the level n re-encoded data portion comprising one or more re-encoded bits of the partitioning level n; determining, based on the level n re-encoded data portion, the level n differential phase $Ø_k(n)$ mapped to the partitioning level n and select, also based on the level n re-encoded data portion, one of the plurality of level n PSK constellation subsets of the level n PSK constellation set, the level n differential phase $Ø_k(n)$ representing a phase difference between the level n PSK constellation subsets of the current symbol $s_k$ and the previous symbol $s_{k-1}$; and providing the level n differential phase $Ø_k(n)$ to the smallest set level, and provide the selected level n PSK constellation subset to the child level of the partitioning level n.

Example 29

The method of any one of examples 26 through 28, wherein demodulating and decoding the smallest set level comprises: getting a level N−1 constellation subset selected at the partitioning level N−1 as the smallest PSK constellation set; detecting a nearest symbol from the level N PSK constellation set as the current symbol $s_k$ based on the received symbol $s_k'$, the nearest symbol being a symbol that is nearest to the received symbol $s_k'$ among the plurality of symbols of the smallest PSK constellation set; determining the total differential phase $Ø_k$ based on the current symbol $s_k$ and the previous symbol $s_{k-1}$; determining the level N differential phase $Ø_k(N)$ mapped to the smallest set level based on the total differential phase $Ø_k$ and the level n differential phases $Ø_k(n)$ from all the partitioning levels n, n=1 . . . N−1; and extracting a level N data portion from the level N differential phase $Ø_k(N)$, the level N data portion comprising one or more bits corresponding to the smallest set level.

Example 30

The method of any one of examples 26 through 29, wherein when the level N data portion is the level N encoded data portion comprising the level N encoded bits, the processor, the transceiver, and/or the memory are further configured to decode the level N data portion into a corresponding level N decoded data portion using the component code associated with the smallest set level, the level N decoded data portion comprising one or more decoded bits of the smallest set level, and wherein when the level N data portion does not comprise encoded bits, the processor, the transceiver, and/or the memory are further configured to output the level N data portion as the corresponding level N decoded data portion.

Example 31

The method of any one of examples 18 through 30, wherein the plurality of modulation levels of the M-ary phase shift keying (PSK) modulation is partitioned in accordance with a transmission modulation coding scheme (MCS), which are associated with parameters MCS={M, N, {Pn}, {R(n)}} or MCS={M, N, {Pn}, Q, {R(n)}} in which M represents a modulation order of the M-ary phase shift keying (PSK) modulation such that $M=2^m$ in which m is a positive integer representing a total number of encoded bits of encoded data received in the current symbol, N represents a number of modulation levels, Pn represents a number of level n PSK constellation subsets for each modulation level n, n=1 . . . N−1, Q represents a modulation order of modulation level N, and R(n) represents a component code corresponding to each modulation level n, n=1 . . . N.

Example 32

A destination apparatus comprising a processor, memory coupled with the processor, the processor and memory configured perform a method of any one of examples 18 through 31.

Example 33

A destination apparatus comprising at least one means for performing a method of any one of examples 18 through 31.

Example 34

A non-transitory computer-readable medium storing code for a destination apparatus comprising a processor, memory coupled with the processor, and instructions stored in the memory and executable by the processor to cause the network node to perform a method of any one of examples 18 through 31.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be communicatively coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A source apparatus configured to perform non-coherent transmission, comprising: a transceiver; a memory; and a processor communicatively coupled to the transceiver and the memory, wherein the processor, the transceiver, and/or the memory are configured to: encode, for each modulation level of at least part of a plurality of modulation levels, a corresponding level uncoded data portion with a component code associated with that modulation level to generate a level encoded data portion to be conveyed in a current symbol, wherein an M-ary phase shift keying (PSK) modulation is partitioned into the plurality of modulation levels; determine a total differential phase between a previous symbol and the current symbol as a sum of level differential phases of the plurality of modulation levels, the level differential phase of each of the plurality of modulation levels being based on the level encoded data portion mapped to that modulation level; and transmit the current symbol based on the total differential phase over a wireless channel, wherein the level encoded data portions of at least two modulation levels conveyed in the current symbol are encoded differently from each other.

2. The source apparatus of claim 1, wherein the current symbol is an M-ary PSK constellation symbol modulated with the total differential phase rotation relative to the previous symbol.

3. The source apparatus of claim 1,
wherein the plurality of modulation levels comprise one or more partitioning levels and a smallest set level, the smallest set level being obtained after all partitioning,
wherein each level encoded data portion comprises one or more encoded bits,
wherein each level uncoded data portion comprises one or more uncoded bits,
wherein at least one parameter of a component code associated with one modulation level is different from at least one parameter of a component code associated with another modulation level, and
wherein each level differential phase is determined as a corresponding modulation level rotation between the previous and the current symbols.

4. The source apparatus of claim 3,
wherein the plurality of modulation levels comprises N modulation levels in which each modulation level n, n=1 . . . N comprises a level n PSK constellation set, each level n PSK constellation set being a PSK constellation,
wherein the modulation levels 1 . . . N−1 are the partitioning levels 1 . . . N−1 and the modulation level N is the smallest set level comprising a smallest PSK constellation set obtained after all partitioning,
wherein for each partitioning level n, n=1 . . . N−1, the level n PSK constellation set of the partitioning level n is divided into a plurality of level n PSK constellation subsets, each level n PSK constellation subset being a PSK constellation,
wherein the plurality of modulation levels comprises at least the partitioning level 1 and the smallest set level,
wherein each modulation level n, n=1 . . . N−1 is a parent level of modulation level n+1, and each modulation level n, n=2 . . . N is a child level of modulation level n−1, and
wherein for each partitioning level n, n=1 . . . N−1, a number of PSK symbols in the level n PSK constellation set of the partitioning level n is greater than a number of PSK symbols in the level n+1 constellation set of the child level.

5. The source apparatus of claim 4, wherein strengths of the component codes of the partitioning levels are such that for each partitioning level n, a code rate of the component code of the partitioning level n is lower than a code rate of the component code of the child level of the partitioning level n.

6. The source apparatus of claim 5, wherein there is no component code associated with the smallest set level such that a smallest set level uncoded data portion remain uncoded when modulated on the current symbol, the smallest set level uncoded data portion being the level uncoded data portion corresponding to the smallest set level.

7. The source apparatus of claim 4,
wherein for each partitioning level n, the level n PSK constellation set of the partitioning level n is divided into a Pn number of the level n PSK constellation subsets such that a number of level n encoded bits per symbol is $\log_2$ Pn, the level n encoded bits being the one or more encoded bits of the level n encoded data portion mapped to the partitioning level n, and
wherein for each partitioning level n, the corresponding level n encoded data portion is used to select one of the level n PSK constellation subsets of the partitioning level n, the selected level n PSK constellation subset having the current symbol as one of its member symbols.

8. The source apparatus of claim 7, wherein for each partitioning level n, the level n differential phase $Ø_k(n)$ of the partitioning level n conveys a phase rotation associated with the selected level n PSK constellation subset of the partitioning level n and a level n PSK constellation subset of the previous symbol.

9. The source apparatus of claim 7, wherein for each partitioning level n other than the partitioning level 1, the level n PSK constellation set of the partitioning level n is one of the plurality of level n−1 PSK constellation subsets selected at the parent partitioning level n−1.

10. The source apparatus of claim 9, wherein the level n PSK constellation subset for each partitioning level n is selected sequentially starting from the partitioning level 1.

11. The source apparatus of claim 7, wherein at the smallest set level, Q represents a modulation order of a smallest PSK constellation set such that a number of level N encoded bits per symbol is $\log_2$ Q, the level N encoded bits being the one or more encoded bits of the level N encoded data portion mapped to the smallest set level, and the smallest PSK constellation set being one of the plurality of level N−1 PSK constellation subsets selected at the partitioning level N−1.

12. The source apparatus of claim 11, wherein there is no component code associated with the smallest set level such that the level N encoded data portion modulated on the current symbol is the same as the level N uncoded data portion.

13. The source apparatus of claim 11, wherein the level N differential phase $Ø_k(N)$ of the smallest set level conveys a phase rotation between the current and previous symbols at the smallest PSK constellation set level.

14. The source apparatus of claim 1, wherein the M-ary phase shift keying (PSK) modulation being partitioned into the plurality of modulation levels in accordance with a transmission modulation coding scheme (MCS), which are associated with parameters MCS={M, N, {Pn}, {R(n)}} or MCS={M, N, {Pn}, Q, {R(n)}} in which
M represents a modulation order of the M-ary phase shift keying (PSK) modulation such that $M=2^m$ in which m is a positive integer representing a total number of encoded bits of encoded data transmitted in the current symbol,
N represents a number of modulation levels,
Pn represents a number of level n PSK constellation subsets for each modulation level n, n=1 . . . N−1,
Q represents a modulation order of modulation level N, and
R(n) represents a component code corresponding to each modulation level n, n=1 . . . N.

15. A destination apparatus configured to perform non-coherent reception, comprising: a transceiver; a memory; and a processor communicatively coupled to the transceiver and the memory, wherein the processor, the transceiver, and/or the memory are configured to: receive a symbol from a source apparatus transmitted over a wireless channel, the received symbol representing a current symbol conveying data and having been differentially modulated based on M-ary phase shift keying (PSK) modulation with a total differential phase, the total differential phase being determined as a sum of a plurality of level differential phases, each of the plurality of level differential phases corresponding to each modulation level of a plurality of modulation levels of the M-ary PSK modulation, a level encoded data portion conveyed in the current symbol being mapped to each of at least part of the plurality of modulation levels; determine the plurality of level differential phases corresponding to the plurality of modulation levels based on the received symbol; extract, for each modulation level, data portion from the level differential phase corresponding to that modulation level, the extracted data portion of each of the at least part of the plurality of modulation levels being level encoded data portion having been protected with a component code associated with that modulation level; and decode, for each of the at least part of the plurality of modulation levels, the level encoded data portion of that modulation level to obtain a corresponding level decoded data portion, wherein the level encoded data portions of at least two modulation levels conveyed in the current symbol are encoded differently from each other.

16. The destination apparatus of claim 15, wherein the current symbol is an M-ary PSK constellation symbol modulated with the total differential phase rotation relative to a previous symbol.

17. The destination apparatus of claim 15,
wherein the plurality of modulation levels comprise one or more partitioning levels and a smallest set level, the smallest set level being obtained after all partitioning,
wherein each level encoded data portion comprises one or more encoded bits,
wherein each level decoded data portion comprises one or more decoded bits,
wherein at least one parameter of a component code associated with one modulation level is different from at least one parameter of a component code associated with another modulation level, and
wherein each level differential phase is determined as a corresponding modulation level rotation between a previous symbol and the current symbol.

18. The destination apparatus of claim 17,
wherein the plurality of modulation levels comprises N modulation levels in which each modulation level n, n=1 . . . N comprises a level n PSK constellation set, each level n PSK constellation set being a PSK constellation,
wherein the modulation levels 1 . . . N−1 are the partitioning levels 1 . . . N−1 and the modulation level N is the smallest set level comprising a smallest PSK constellation set obtained after all partitioning,
wherein for each partitioning level n, n=1 . . . N−1, the level n PSK constellation set of the partitioning level n is divided into a plurality of level n PSK constellation subsets, each level n PSK constellation subset being a PSK constellation, wherein the plurality of modulation levels comprises at least the partitioning level 1 and the smallest set level, wherein each modulation level n, n=1 . . . N−1 is a parent level of modulation level n+1, and each modulation level n, n=2 . . . N is a child level of modulation level n−1, and wherein for each partitioning level n, n=1 . . . N−1, a number of PSK symbols in the level n PSK constellation set of the partitioning level n is greater than a number of PSK symbols in the level n+1 constellation set of the child level.

19. The destination apparatus of claim 18, wherein strengths of the component codes of the partitioning levels are such that for each partitioning level n, a code rate of the component code of the partitioning level n is lower than a code rate of the component code of the child level of the partitioning level n.

20. The source apparatus of claim 19, wherein there is no component code associated with the smallest set level such that a smallest set level uncoded data portion remain uncoded when modulated on the current symbol, the smallest set level uncoded data portion being the level uncoded data portion corresponding to the smallest set level.

21. The destination apparatus of claim 18, wherein the processor, the transceiver, and/or the memory are configured to extract and decode the level encoded data portion mapped to each modulation level sequentially starting from the partitioning level 1.

22. The destination apparatus of claim 21, wherein the processor, the transceiver, and/or the memory are further configured to:
re-encode, for each partitioning level n, the level n decoded data portion of the partitioning level n to generate a corresponding level n re-encoded data portion comprising one or more re-encoded bits; and
select, for each partitioning level n, one of the level n PSK constellation subsets of the partitioning level n based on the one or more re-encoded bits of the corresponding level n re-encoded data portion, the selected level n PSK constellation subset being used to extract and decode the level n+1 encoded data portion of the child level of the partitioning level n.

23. The destination apparatus of claim 21,
wherein for each partitioning level n, the level n PSK constellation set of the partitioning level n is divided into a Pn number of the level n PSK constellation subsets such that a number of level n encoded bits per symbol is $\log_2 Pn$, the level n encoded bits being the one or more encoded bits of the level n encoded data portion mapped to the partitioning level n,
wherein at the smallest set level, Q represents a modulation order of a smallest PSK constellation set such that a number of level N encoded bits per symbol is $\log_2 Q$, the level N encoded bits being the one or more encoded bits of the level N encoded data portion mapped to the smallest set level, and
wherein in extracting and decoding for each modulation level, the processor, the transceiver, and/or the memory are configured to:
for each partitioning level, demodulate and decode the level n encoded data portion mapped to the partitioning level to obtain the corresponding level n decoded data portion; and demodulate and decode the level N encoded data portion mapped to the smallest set level to obtain the corresponding level N decoded data portion subsequent to demodulating and decoding all of the partitioning levels.

24. The destination apparatus of claim 23, wherein in demodulating and decoding the partitioning level 1, the processor, the transceiver, and/or the memory are configured to:
detect a first PSK constellation subset from the M-ary PSK constellation based on the received symbol $s'_k$, the first PSK constellation subset being the level 1 PSK constellation subset that is nearest to the received symbol $s'_k$ among the plurality of level 1 PSK constellation subsets of the M-ary PSK constellation;
determine a first differential phase $\varnothing'_k(1)$ of the first PSK constellation subset, the first differential phase $\varnothing'_k(1)$ representing a phase difference between the first PSK constellation subset and a level 1 PSK constellation subset of the previous symbol $s_{k-1}$;
extract the level 1 encoded data portion from the first differential phase $\varnothing'_k(1)$;
decode the level 1 encoded data portion into a corresponding level 1 decoded data portion using the component code associated with the partitioning level 1, the level 1 decoded data portion comprising one or more decoded bits of the partitioning level 1;
re-encode the level 1 decoded data portion to generate a level 1 re-encoded data portion using the component code associated with the partitioning level 1, the level 1 re-encoded data portion comprising one or more re-encoded bits of the partitioning level 1;
determine, based on the level 1 re-encoded data portion, the level 1 differential phase $\varnothing_k(1)$ mapped to the partitioning level 1 and select, also based on the level 1 re-encoded data portion, one of the plurality of level 1 PSK constellation subsets of the M-ary PSK constellation, the level 1 differential phase $\varnothing_k(1)$ representing a phase difference between the level 1 PSK constellation subsets of the current symbol $s_k$ and the previous symbol $s_{k-1}$; and
provide the level 1 differential phase $\varnothing_k(1)$ to the smallest set level, and provide the selected level 1 PSK constellation subset to the child level of the partitioning level 1.

25. The destination apparatus of claim 23, wherein in demodulating and decoding the partitioning level n, n=2 . . . N−1, the processor, the transceiver, and/or the memory are configured to:
get a level n−1 PSK constellation subset selected at the parent level of the partitioning level n as the level n PSK constellation set;
detect an n'th PSK constellation subset from the level n PSK constellation set based on the received symbol $s'_k$, the n'th PSK constellation subset being the level n PSK constellation subset that is nearest to the received symbol $s'_k$ among the plurality of level n PSK constellation subsets of the level n PSK constellation set;
determine an n'th differential phase $\varnothing'_k(n)$ of the n'th PSK constellation subset, the n'th differential phase $\varnothing'_k(n)$ representing a phase difference between the n'th PSK constellation subset and a level n PSK constellation subset of the previous symbol $s_{k-1}$;
extract the level n encoded data portion from the n'th differential phase $\varnothing'_k(n)$;
decode the level n encoded data portion into a corresponding level n decoded data portion using the component code associated with the partitioning level n, the level n decoded data portion comprising one or more decoded bits of the partitioning level n;

re-encode the level n decoded data portion to generate a level n re-encoded data portion using the component code associated with the partitioning level n, the level n re-encoded data portion comprising one or more re-encoded bits of the partitioning level n;

determine, based on the level n re-encoded data portion, the level n differential phase $\varnothing_k(n)$ mapped to the partitioning level n and select, also based on the level n re-encoded data portion, one of the plurality of level n PSK constellation subsets of the level n PSK constellation set, the level n differential phase $\varnothing_k(n)$ representing a phase difference between the level n PSK constellation subsets of the current symbol $s_k$ and the previous symbol $s_{k-1}$; and provide the level n differential phase $\varnothing_k(n)$ to the smallest set level, and provide the selected level n PSK constellation subset to the child level of the partitioning level n.

26. The destination apparatus of claim 23, wherein in demodulating and decoding the smallest set level, the processor, the transceiver, and/or the memory are configured to:

get a level N−1 constellation subset selected at the partitioning level N−1 as the smallest PSK constellation set;

detect a nearest symbol from the level N PSK constellation set as the current symbol $s_k$ based on the received symbol $s'_k$, the nearest symbol being a symbol that is nearest to the received symbol $s'_k$ among the plurality of symbols of the smallest PSK constellation set;

determine the total differential phase $\varnothing_k$ based on the current symbol $s_k$ and the previous symbol $s_{k-1}$;

determine the level N differential phase $\varnothing_k(N)$ mapped to the smallest set level based on the total differential phase $\varnothing_k$ and the level n differential phases $\varnothing_k(n)$ from all the partitioning levels n, n=1 . . . N−1; and extract a level N data portion from the level N differential phase $\varnothing_k(N)$, the level N data portion comprising one or more bits corresponding to the smallest set level.

27. The destination apparatus of claim 26, wherein when the level N data portion is the level N encoded data portion comprising the level N encoded bits, the processor, the transceiver, and/or the memory are further configured to decode the level N data portion into a corresponding level N decoded data portion using the component code associated with the smallest set level, the level N decoded data portion comprising one or more decoded bits of the smallest set level, and wherein when the level N data portion does not comprise encoded bits, the processor, the transceiver, and/or the memory are further configured to output the level N data portion as the corresponding level N decoded data portion.

28. The destination apparatus of claim 15, wherein the plurality of modulation levels of the M-ary phase shift keying (PSK) modulation is partitioned in accordance with a transmission modulation coding scheme (MCS), which are associated with parameters MCS={M, N, {Pn}, {R(n)}} or MCS={M, N, {Pn}, Q, {R(n)}} in which M represents a modulation order of the M-ary phase shift keying (PSK) modulation such that $M=2^m$ in which m is a positive integer representing a total number of encoded bits of encoded data received in the current symbol, N represents a number of modulation levels, Pn represents a number of level n PSK constellation subsets for each modulation level n, n=1 . . . N−1, Q represents a modulation order of modulation level N, and R(n) represents a component code corresponding to each modulation level n, n=1 . . . N.

29. A method of a source apparatus configured to perform non-coherent transmission, the method comprising: encoding, for each modulation level of at least part of a plurality of modulation levels, a corresponding level uncoded data portion with a component code associated with that modulation level to generate a level encoded data portion to be conveyed in a current symbol, wherein an M-ary phase shift keying (PSK) modulation is partitioned into the plurality of modulation levels; determining a total differential phase between a previous symbol and the current symbol as a sum of level differential phases of the plurality of modulation levels, the level differential phase of each of the plurality of modulation levels being based on the level encoded data portion mapped to that modulation level; and transmitting the current symbol based on the total differential phase over a wireless channel, wherein the level encoded data portions of at least two modulation levels conveyed in the current symbol are encoded differently from each other.

30. A method of a destination apparatus configured to perform non-coherent reception, the method comprising: receiving a symbol from a source apparatus transmitted over a wireless channel, the received symbol representing a current symbol conveying data and having been differentially modulated based on M-ary phase shift keying (PSK) modulation with a total differential phase, the total differential phase being determined as a sum of a plurality of level differential phases, each of the plurality of level differential phases corresponding to each modulation level of a plurality of modulation levels of the M-ary PSK modulation, a level encoded data portion conveyed in the current symbol being mapped to each of at least part of the plurality of modulation levels; determine the plurality of level differential phases corresponding to the plurality of modulation levels based on the received symbol; extracting, for each modulation level, data portion from the level differential phase corresponding to that modulation level, the extracted data portion of each of the at least part of the plurality of modulation levels being level encoded data portion having been protected with a component code associated with that modulation level; and decoding, for each of the at least part of the plurality of modulation levels, the level encoded data portion of that modulation level to obtain a corresponding level decoded data portion, wherein the level encoded data portions of at least two modulation levels conveyed in the current symbol are encoded differently from each other.

* * * * *